United States Patent
Jacobs et al.

(10) Patent No.: US 8,406,729 B2
(45) Date of Patent: *Mar. 26, 2013

(54) METHODS AND SYSTEMS FOR RELAYING OUT OF RANGE EMERGENCY INFORMATION

(75) Inventors: Ross Jacobs, Bessemer, AL (US); Geoffrey Zampiello, Norwalk, CT (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/524,185

(22) Filed: Jun. 15, 2012

(65) Prior Publication Data

US 2012/0252398 A1    Oct. 4, 2012

Related U.S. Application Data

(63) Continuation of application No. 12/434,065, filed on May 1, 2009, now Pat. No. 8,208,891.

(51) Int. Cl.
*H04M 11/04* (2006.01)
(52) U.S. Cl. .................. 455/404.1; 455/11.1; 455/13.1; 455/41.2; 455/41.3; 455/421; 455/466; 370/310.2; 370/312; 370/328; 370/338; 370/351; 370/352; 370/353; 370/354; 370/355; 370/356; 370/357
(58) Field of Classification Search .................. 455/11.1, 455/13.1, 41.2, 41.3, 404.1, 421, 466; 370/251–357
See application file for complete search history.

(56) References Cited

U.S. PATENT DOCUMENTS

| | | |
|---|---|---|
| 5,109,526 A | 4/1992 | Reed |
| 5,705,980 A | 1/1998 | Shapiro |
| 5,822,697 A | 10/1998 | Matsuzawa |
| 5,857,144 A | 1/1999 | Mangum et al. |
| 5,890,054 A | 3/1999 | Logsdon et al. |
| 5,966,640 A | 10/1999 | Leath et al. |
| 6,226,494 B1 | 5/2001 | Lundstrom et al. |
| 6,690,302 B1 | 2/2004 | Inomata |
| 6,768,417 B2 | 7/2004 | Kuragaki et al. |
| 6,930,596 B2 | 8/2005 | Kulesz et al. |
| 7,206,849 B1 | 4/2007 | Gernert et al. |
| 7,356,305 B2 | 4/2008 | Peeters |
| 7,894,794 B2 | 2/2011 | Boss et al. |
| 8,208,891 B2 | 6/2012 | Jacobs et al. |
| 2004/0081117 A1 | 4/2004 | Malek et al. |
| 2005/0086261 A1 | 4/2005 | Mammone |
| 2008/0052407 A1 | 2/2008 | Baudino et al. |

*Primary Examiner* — Steve D Agosta
(74) *Attorney, Agent, or Firm* — Woodcock Washburn LLP

(57) ABSTRACT

A report message may be transmitted with collaborated information related to the occurrence of an emergency event. A plurality of devices, such as mobile communications devices, that are out of range of a communications network can communicate via direct communication, such as device-to-device communication, to corroborate characteristics that are indicative of an occurrence of an emergency event. Information related to the occurrence may be collaborated amongst the plurality of devices. A transmitting device, which may be one of the plurality of devices that corroborates characteristics or collaborates information, may generate and transmit the report message comprising the collaborated information. A receiving device may provide the message over a communications network, or the report message may continue to be handed off between devices capable of direct communication, the message eventually reaching a device that is within range of the communications network.

10 Claims, 10 Drawing Sheets

METHODS AND SYSTEMS FOR RELAYING OUT OF RANGE EMERGENCY INFORMATION

CROSS-REFERENCE TO RELATED APPLICATIONS

This application is a continuation of, and claims priority to, U.S. patent application Ser. No. 12/434,065, filed May 1, 2009, which is incorporated herein by reference in its entirety.

BACKGROUND

Often, a mobile communications device, such as a cell phone, is unable to complete a call because the device is out of range of the communications network (i.e., too far from a cell tower to acquire signal) or in a location where there is interference to the communications network signal (e.g., hills, buildings, etc.). For example, there is typically less communications network coverage (i.e., minimal cell towers) in rural or secluded areas or far offshore. At least for some short range communications, mobile communications devices can be programmed with the capability for close range communication with other devices such that the communication does not require access to the communications network. For example, peer to peer communication is an alternative method of communication between devices, enabling individuals in short range to communicate with each other despite not having access to the communications network. Devices that are capable of close range communications can communicate, share programs, resources, swap data, etc.

However, devices that are out of range of a communications network are limited to the short range communication and are not able to communicate over longer distances or over the communications network to which they may subscribe. The lack of communication over the communications network can be particularly troublesome in the midst of an emergency event. For example, if a car rolls over an embankment and into an area that doesn't have communications network coverage, the occupants in the car, who may be trapped or injured, may not be able to use their mobile communications devices to call for help.

SUMMARY

Disclosed herein are techniques for transmitting a report message with collaborated information related to the occurrence of an emergency event. A plurality of devices, such as mobile communications devices, that are out of range of a communications network can communicate via direct communication, such as device-to-device communication, to corroborate characteristics that are indicative of an occurrence of an emergency event. Information related to the occurrence may be collaborated amongst the plurality of devices. A transmitting device, which may be one of the plurality of devices that corroborates characteristics or collaborates information, may generate and transmit the report message comprising the collaborated information. The communication and collaboration can be independent of user involvement which is particularly beneficial if the user is an unconscious or impaired accident victim.

The transmitting device, such as a mobile communications device, may provide the report message via direct communication when the device is not within range of a communications network. For example, the transmitting device may broadcast the report message or may search for devices that are capable of direct communication within direct communication range of the transmitting device. The transmitting device, while out of range of the communications network, can therefore communicate the collaborated emergency information to a second device. The second device may or may not be associated with the emergency event. The second device may be a relay device that can transmit the report message to another relay device, can transmit the message to a network, or can store the message until the second device enters a network.

The emergency message may continue to be handed off between devices capable of direct communication, the message eventually reaching a device that is within range of the communications network. Thus, the devices that are out of range of the communications network can form a type of mesh network with each other for corroboration and/or collaboration, and the mesh network may extend to devices that continue to relay the collaborated information, that are within range of the network, or that enter into the range, therefore virtually increasing the coverage area of the out-of-range devices. The intelligent sharing of information can provide distress messages, with enriched content, to emergency teams, even when the user and/or full cellular coverage isn't available.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The foregoing Summary, as well as the following Detailed Description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
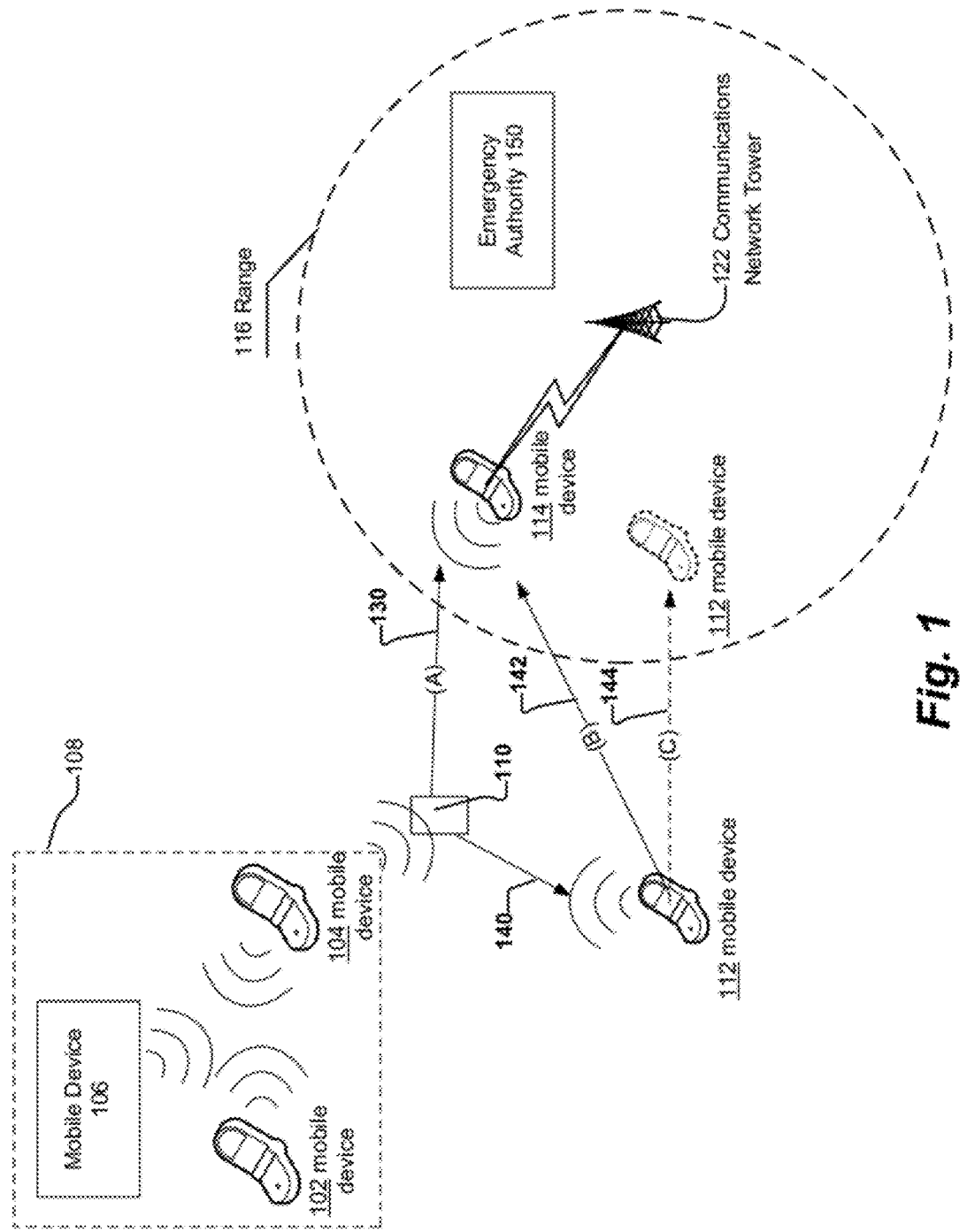
FIG. 1 depicts an example system of devices that can employ the disclosed techniques to communicate an emergency message.

Disclosed herein are techniques for providing a report message with collaborated information related to the occurrence of an emergency event from a transmitting device, such as a mobile communications device, that is out of range of a communications network.

A plurality of devices that are out of range of a communications network can communicate via direct communication, such as device-to-device communication, to corroborate characteristics that are indicative of an occurrence of an emergency event. Information related to the occurrence may be collaborated amongst a plurality of devices within direct communication range of each other. A transmitting device, such as a mobile communications device, may provide the report message via direct communication to a relay device. The relay device can receive the report message and transmit the message to another device, transmit the message to a network, or store the message until the second device enters a network.

Thus, devices that lack a connection with the communications network can form a type of mesh network with each other to corroborate characteristics that are indicative of an emergency event and collaborate information related to the occurrence. The mesh network can extend to relay devices that relay the collaborated information either to another relay device, or over the communications network. The mesh network virtually increases the coverage of the out of range transmitting device. The intelligent sharing of information can provide distress messages, with enriched content, to emergency teams, even when the user and/or full cellular coverage isn't available.

The aspects summarized above can be embodied in various forms. The following description shows, by way of illustration, combinations and configurations in which the aspects can be practiced. It is understood that the described aspects and/or embodiments are merely examples. It is also understood that other aspects and/or embodiments can be utilized, and structural and functional modifications can be made, without departing from the scope of the present disclosure. For example, although some aspects herein relate methods of collaborating emergency information to wireless device-to-device communications, it should be noted that the devices can collaborate via alternate methods such as via manual inputs or wired device-to-device communications, for example.

Furthermore, in the discussion that follows, details relating to devices, such as transmitting or relay devices, and networks, such as communications networks, are assumed to be well known. Accordingly, such details are largely omitted herein for the sake of clarity and explanation. In addition, any references herein to an example embodiment of a transmitting device or a relay device involving a cellular telephone is solely for purposes of explanation, and is not intended to limit the techniques disclosed to any such embodiment. For example, a device as contemplated by various embodiments of the techniques disclosed may include, but are not limited to: a mobile communications devices, cellular telephones, personal digital assistants (PDAs), email devices and the like. A device may operate in a cellular, SMR, PCS, cordless, unlicensed AWS, 700 MHz, or other spectrums. Furthermore, embodiments are not limited by the network servicing the device. Accordingly, embodiments may be applicable to any network type including, for example, TDMA, CDMA, WCDMA, GSM, WiFi, WiMAX, OFDM, UMTS, EV-DO, HSDPA/HSUPA and other standards now known or to be developed in the future.

Reference throughout this specification to "one embodiment," "an embodiment," "an example embodiment," or similar language means that a particular feature, structure, or characteristic described in connection with the embodiment is included in at least one embodiment of the present techniques disclosed. Thus, appearances of the phrases "in one embodiment," "in an embodiment," "an example embodiment," and similar language throughout this specification may, but do not necessarily, all refer to the same embodiment.

Furthermore, the described features, structures, or characteristics of the disclosed techniques may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosed techniques. One skilled in the relevant art will recognize, however, that the disclosed techniques may be practiced without one or more of the specific details, or with other methods, components, materials, and so forth. For example, a component describes any implementation in hardware, software or a combination of both.

A component may comprise implementing software that executes on a processor. It is emphasized that a processor can be implemented as a single processor or multiple processors. Multiple processors can be distributed or centrally located. Any combination of processors that is suitable for performing the techniques disclosed herein is contemplated. Multiple processors can communicate wirelessly, via hard wire, or a combination thereof. In other instances, well-known structures, materials, or operations are not shown or described in detail to avoid obscuring aspects of the disclosed techniques.

FIG. 1 depicts an example system of devices that can employ the disclosed techniques to communicate an emergency report message. Shown is an example communications network comprising a communications network tower 122 having a communications network range 116, a plurality of mobile devices that are out of range or otherwise lack a connection with the communications network, 102, 104, 106, and 112, and a device that is within range of the communications network 114. Any combination of devices, in and out of range of the communications network, are contemplated for use with the disclosed techniques.

The devices that are associated with the emergency event, shown grouped as collaborating devices 108, can collaborate information to generate an emergency message. In particular, FIG. 1 depicts devices 102, 104, and 106 as example emergency-event associated devices 108. The devices associated with an emergency, that may include any number or type of devices capable of direct or device-to-device communication, can be those devices that are in proximity to the emergency. For example, if a vehicle is involved in an accident, mobile device 102 may be a cellular device associated with a first occupant, mobile device 104 may be a cellular device associated with a second occupant, and the mobile device 106 may be a GPS unit installed in the vehicle.

The plurality of devices 108 can have capabilities to measure or identify characteristics indicative of an emergency event. For example, mobile device 102 can include an accelerometer that identifies a high velocity impact. Each of the devices 102, 104, 106 can receive and transmit information to each other via direct or device-to-device communication. Based on the direct communication, information from any of the plurality of devices 108 can be used to corroborate the occurrence of the emergency event. For example, mobile devices 102 and 106 may both measure velocity data and compare the information to determine that there was a high impact event. Thus, the corroboration of the high impact event may be accomplished via two of the devices available for direct communication. One or more devices may be internal to a device, such as device 102, that may corroborate the emergency event. For example, device 102 may include both an accelerometer and a temperature gauge. The accelerometer may detect a high impact and, together, with an abnormal reading from the temperature gauge, together the unexpected or abnormal circumstances may be indicative of the occurrence of an emergency event. While the corroboration is not of either specific event, the combination of two irregular circumstances may provide sufficient corroboration.

At least one device that identifies a characteristic that is indicative of the occurrence of an emergency event may search for other devices within direct communication range. The device may seek other devices to corroborate the information that indicates the occurrence of the emergency event. For example, in the example involving the vehicle accident above, if mobile devices 102 and 104 corroborate and confirm characteristics that are consistent with an emergency event, the devices may attempt device-to-device communication with any other mobile devices within device-to-device-communication range. An identification may be made of any mobile device that is within device-to-device-communication. The identification may associate the mobile device with the emergency event.

The ability to corroborate an emergency event provides confidence in the validity of an emergency message generated to indicate the emergency. For example, cell phones may be embedded with an accelerometer. However, cell phones are often dropped, and so relying strictly on the single cell phones' internally embedded accelerometer may produce a false positive emergency distress signal. If that phone can verify the event with other devices, such as other nearby cell phones, however, the confidence level of the message can be increased. If the characteristics consistent with an emergency event can be verified with other devices, such as a GPS, a vehicle's GPS, accelerometer, an onboard sensor, a g-force sensor, engine status, water sensors, gyro rate sensors, temperature sensor, or the like, then there is increased confidence that an emergency event has occurred. The level of corroboration of the emergency event may be defined by a confidence factor, and a threshold confidence factor may trigger the transmission of a report message. Thus, the emergency report message may be sent with a higher confidence that an emergency event occurred and provide an indication of the confidence factor to the recipient. Furthermore, the collaboration of information between devices can enrich the content of the emergency message, thereby building a confidence factor in the content of the message and further helping emergency personnel properly prepare for the scenario.

Once the devices have corroborated to provide a sufficient level of confidence that an emergency event has occurred, the mobile devices may seek other mobile devices associated with the emergency for collaboration of information related to the occurrence. For example, if mobile device 102 and 104 in FIG. 1 corroborate characteristics that are indicative of the occurrence of an emergency event, mobile device 102 may transmit a handshake message to identify other mobile devices within an operable range for direct communications. Mobile device 106 may respond in this example. The devices within operable range for direct communications can provide additional information for collaboration to provide an enriched emergency report. For example, mobile device 106 may not have information that is indicative of the emergency event, but may have information that can supplement the corroborated information. For example, device 106 may be an onboard GPS unit. Thus, device 106 may provide coordinates that correspond to the current location of device 106 and/or previous GPS data and time. The information may supplement the information available with respect to the occurrence of the emergency event.

A mobile communications device can be programmed to attempt to ring the mobile phone as a result of an emergency event. For example, a mobile device can record or identify at least one characteristic indicative of an emergency event or can measure a threshold confidence factor from the cross-device collaboration that indicates the occurrence of an emergency event. The mobile device can ring its own phone number pre-programmed into the device. If the user fails to answer, this information can further indicate the occurrence of the emergency event. The failure of the user to answer in the emergency-event information can be included in the emergency report message. The mobile device can initiate a call to a user and enter speaker-phone mode to record noises or voices of users that may be unable to physically reach or access the mobile device. The information gathered from attempting to contact the user may be information included in the collaborated report message.

It may be desirable to include a limit to the range over which other mobile devices are sought or associated with the emergency event. For example, mobile device 102 could include a proximity sensor that determines the distance from a mobile device to which it is communicating and determine whether or not that mobile device should be identified for corroboration or collaboration. The corroborated information may be sufficiently consistent with a specific emergency event, and parameters associated with the specific emergency event may define the limits as to the distance for which other mobile devices should be sought or included for the collaboration of information. Also, applying similar principles for the detection of other devices and limiting that range under certain circumstances, a victim count can begin by peer-to-peer communication between devices. Within a certain proximity, the number and type of devices that are within direct communication may indicate a number of victims. For example, if 4 mobile devices are identified, two of which are onboard GPS devices and two of which are mobile communications device, and the corroboration of information indicates a car crash emergency event, the number and type of devices may indicate at least two vehicles and at least two possible victims.

The combination of devices that are capable of device-to-device communications and/or communication over a communications network can cooperate to transmit a collaborated emergency message over the communications network. Any of the mobile devices 102, 104, 106, 112, or 114 shown in FIG. 1 can be capable of communicating over the communications network or be capable of other wireless communications, such as communications over a personal area network, a wide area network, a metropolitan area network, or a local area network. However, as shown in this example, whether or not mobile devices 102, 104, 106, and 112 are capable of communicating over a communications network, they are not presently within range of the communications network and are therefore lack a connection to the communications network.

The mobile communications devices 102, 104, 106, 112, and 114 may be representative of any appropriate type of mobile device that is capable of direct or device-to-device communications. For example, the mobile communications devices 102, 104, 112, and 114 are shown in FIG. 1 as cellular devices that a user typically carries on his or her person. Mobile device 106 could also be a cellular device, but is representative of any mobile communications device capable of direct communication. Direct communications can include device-to-device communication, peer-to-peer communication, communication over a personal area network, Bluetooth communications, Zigbee, short range broadcasts, infrared communication, radio communications, digital communication, beacon communications, WiFi, or any other method of device-to-device communication, including wired, wireless, or manually transferred information.

The transmitting device, as it is described herein, may include any mobile device that may be utilized, for example, to collaborate emergency-event information with at least one other mobile device and/or transmit the collaborated emergency information with another mobile device via device-to-device communication. According to example embodiments, the transmitting device, relay device, mobile device, or the like, may be, for example, a portable device, a variety of computing devices including: a portable media player, e.g., a portable music player, such as an MP3 player, a walkmans, etc., a portable computing device, such as a laptop, a personal digital assistant ("PDA"), a portable phone, such as a cell phone or the like, a smart phone, a Session Initiation Protocol (SIP) phone, a video phone, a portable email device, a thin client, a portable gaming device, etc., consumer electronic devices, such as TVs, DVD players, set top boxes, monitors, displays, etc., a public computing device, such as a kiosk, an in-store music sampling device, an automated teller machine (ATM), a cash register, etc., (e) a navigation device whether portable or installed in-vehicle and/or a non-conventional computing device, such as a kitchen appliance, a motor vehicle control (e.g., steering wheel), etc., or a combination thereof.

As described above, the plurality of devices 108 can collaborate information associated with an emergency event. Additional emergency-event associated devices may be identified, such as those within a certain proximity to the emergency event or already identified emergency-event associated devices. In an example scenario, a potential emergency event can be corroborated by both the mobile device 102 and the mobile device 106 indicating the occurrence of a sudden temperature or velocity change. The sudden temperature change could indicate a fire, for example, and a sudden velocity change could indicate a high impact crash, for example. As a result of the identification by mobile device 102 and 106 of circumstances that suggest the occurrence of an emergency event, mobile devices 102 and 106 may be identified as being associated with the emergency event and having corroboratory or collaborating information. Another device, such as mobile device 104, may be associated with the emergency event if it is in a certain proximity to mobile devices 102 or 106 or if mobile device 104 has additional information that corroborates an occurrence of the emergency event or can provide information that collaborates with the other available information. For example, mobile device 104 could be carried by an occupant in a second vehicle involved in a car accident and measure velocity changes that corroborate the occurrence of the emergency event. Similarly, mobile device 104 could comprise the time or weather-related information that may become part of the report message.

Together, devices 102, 104, and 106 that are associated with an emergency event can collaborate information so as to compile information related to the occurrence of an emergency event. Collaboration of information may include collecting, comparing, compiling various types of information available from each of the mobile devices associated with the emergency event. The information obtained as a result of the collaboration of the emergency-event associated devices can be used to generate an enriched emergency message. For example, mobile device 102 can be a cellular phone that identifies a high velocity change and corroborates the identity of this with mobile device 104, and mobile device 106 could be a GPS capable unit in proximity to mobile devices 102 and 106 and installed in the vehicle. Each of the emergency-event associated devices could compile velocity information and the GPS unit could obtain positional data. The information can collectively be packaged into a single emergency report message or several emergency report messages for transmission or broadcast.

The types of information available, and therefore the content of the emergency message, may depend on the capabilities of the mobile device. The information may include a location, such as GPS coordinates. The message may include an indication of the number of devices included in the collaboration and/or the number of devices that corroborate the occurrence of an emergency event. The indication of the number of devices included in the collaboration and/or the number of devices that corroborate the occurrence of an emergency event could be used to provide a confidence level in the message. The information collaborated may be compared against characteristics of and correlated to a particular emergency event. The likelihood of a particular emergency event may also include with it a potential severity based on the type of emergency or the characteristics identified. For example, the amount of change in a velocity, that might indicate a vehicular accident, could indicate the likely severity of the accident. The message could include a unique identifier (ID) of the device transmitting the message and/or of each emergency-event associated device. Other information that can be included in the message is a time stamp indicating when the message was sent, an estimation of the time of the emergency, the time stamp of the last geo-fix, auxiliary information (e.g., vehicle information, such as inside/outside temperature, vehicle orientation), number of times the message was transmitted, the number of times it was received by another mobile device, or any other reading from a sensor or similar device that is coupled to or can communicate with a mobile device.

In another embodiment, the emergency messages can be limited to a set number of relay hops. Thus, the transmitting device can limit the number of times it transmits the emergency message and/or the emergency report message may contain information that indicates how many hops the message has taken (i.e., how many relays have been made between the current and originating device). A relay device that receives the report message may evaluate the relay hop information to determine whether or not to continue relaying the report message. The emergency report message can contain a timing segment and after a certain period of time, the emergency report message may no longer be valid and/or delete from any devices storing the emergency report message.

Non-emergency related data can be made available for recreational purposes. For non-emergency situations, devices can share data and services from nearby devices. This can be used for advertising, location based services, vehicle services, etc. The devices associated with the accident could communicate short range to confirm events between devices that can communicate on common channels.

At least one of the plurality of devices 108 may be capable of transmitting, i.e., a transmitting device, via known transmission techniques, such as broadcasting. The transmitting device may provide the emergency message via direct communication. In an example embodiment, at least one of the plurality of devices 108 is capable of transmitting the emergency message to another device. In another example embodiment, a device is selected for the transmission of the collaborated information. For example, during collaboration, the device with the longest transmission capabilities, longer battery life, more advanced message generation, or the like, may be selected to transmit the emergency-event information. Thus, one of the plurality of devices may be selected for transmitting so as to handoff the emergency message to another device.

A device that receives the emergency message may or may not be associated with the emergency event. For example, mobile device 104 is shown in FIG. 1 as the transmitting device that provides the report message 110 via device-to-device communication. At least one mobile device in the system of devices, such as mobile device 114, is representative of a mobile device that is responsive to a communications network. The remaining devices may or may not be responsive to a communications network but at least have device-to-device communication capabilities for collaborating information or otherwise communicating.

The transmitted report message can take various routes to communicate with or otherwise access the communications network. In an example embodiment, the techniques include a method of transmitting a message between a mobile communications device that is not within range of a communications network, such as device 102, 104, or 106, to a mobile communications device that is within range, such as mobile device 114.

A mobile communications device that is within range 116, such as mobile device 114, can receive the message and relay the message over the communications network. In an example embodiment, at 130 (or route A), the mobile device 114 can receive the emergency message. Mobile device 114, shown within range of the communications network (i.e., within range 116 of communications network tower 122), can receive the emergency message 110 and transmit the message over the communications network. Thus, the report message generated from the collaboration of at least one of the out-of-network devices 102, 104, and 106 is able to reach the communications network via the direct communication between mobile device 104 and mobile device 114. Thus, device 104 and device 114 are within range for operable device-to-device communication in this example at a point when the report message is transmitted from mobile device 104.

Mobile device 114 may receive the emergency message 110 and, because it is within range of the communications network tower 122, the mobile device 114 can transmit the emergency message. The communications network tower 122 may recognize the report message as an emergency message and transmit the emergency message to an appropriate authority, such as emergency authority 150. These techniques enable the emergency message, generated out-of-network and by a device that is not capable of communicating over the communications network, to reach a suitable emergency authority via the communications network.

In another example embodiment, at 140, a mobile device 112 may receive the emergency message 110. The mobile device 112 may be out of range of the communications network, but capable of direct communication with another mobile device, such as device 114, at 142 (or route B). The mobile device 112, may be located closer in proximity to the range of the communications network tower 122, but still not close enough to transmit over the communications network. However, at 142, or route B, the mobile device 112 can be within operable range for device-to-device communication with mobile device 114. Again, device 114 is representative of a mobile device that is responsive to the communications network and within range of the communications network tower 122. Mobile device 114 may receive the emergency message 110 from mobile device 112. Because mobile device 114 is within range of the communications network tower 122, the mobile device 114 can transmit the emergency message to an emergency authority 150 over the communications network.

In another example embodiment, mobile device 112 may receive the emergency message 110, at 140, and store the information in local memory. Such a communications handoff can "stick" on a receiving phones until the emergency message can be off-loaded onto the cellular network. In this example, a second mobile device, such as device 112, can come within a direct communication range of a transmitting device that is out of range of the communications network, such as transmitting device 104. The device 122 may receive a report message from device 104 while in the direct communication range of device 104. As the mobile device changes location, such as by moving along path C at 144, and enter the range 116 of the communications network tower 122. The mobile device 112 may identify that it has come within range of the communications network and transmit the emergency message 110 to an emergency authority 150 over the communications network. If the mobile device 112 moves within range of the communications network tower 122, the mobile device 112 can then transmit the emergency message itself to an emergency authority 150 over the communications network, rather than relaying the message to another device, such as device 114.

Even if the user of mobile device 112 ignores the emergency or processing is transparent to the user, the mobile device can be a carrier of the distress signal until the mobile device enters into coverage area or comes within device-to-device communication with another person with a mobile device. In another example embodiment, the recipient device, such as device 112, may provide an alert that indicates the device has received an emergency report message. Thus, the user of the device 112 may identify the receipt of an emergency message and assist the relay of the emergency report message by purposefully relocating into a region that the user's device 112 is within range of the communications tower, such as moving within range 116.

For example, consider a group of campers in the woods in a remote area that is out of range of a communications network. One of the campers may receive an indication of an emergency report message. Without knowing additional details, the camper may appreciate that a victim could be in the woods, lost or hurt, but within a close enough range that allows direct communication between the victim's device and the camper's device. Recognizing that the emergency message may need to be relayed to assist the potential victim, the camper may travel towards a less remote area or drive to a more public place that provides the device with a connection to the communications network, or at least, provides the possibility that other devices in the vicinity may pick up the report message from the camper and relay the emergency report message.

Thus, as shown by the example embodiments, when not in range of a cell tower, i.e., no communication with the communications network, a device can communicate a message via direct communication to a mobile device that can further relay the emergency message (e.g., mobile device, vehicle, etc.) such as via Bluetooth, WiFi, ZigBee, or the like, for example. The relaying device can transmit the message to another device, can transmit the message to a network, or store the message until it enters a network. For example, the second device can be within range or move within range of the communications network (i.e., a cell tower) and transmit the report message with emergency information over the communications network.

The relaying device, such as relay device 112, can receive and store the message, and then transmit the message on behalf of the transmitting device when it enters the range of a communications network. A plurality of relaying devices can also act as a repeaters, handing off information via device-to-device communication until the message reaches a device that is within range of the network or that enters the range of a network. Thus, the techniques can function to extend coverage of short-range communications, e.g., via peer-to-peer direct device communications, such that an emergency message from an originating out-of-network device eventually reaches the communications network. Theoretically, a user who needs to make an emergency call could be twenty miles away from a cell tower. In between the user and the tower there can be two other cell phone users. One of those devices may have the capability to communicate with the cell tower. Each one of the devices in the relay chain can relay the emergency call from the transmitting device through the other two phones and finally to the cell tower.

The emergency authority 150 may be, for example, an emergency personnel (e.g., fire fighter, police officer, emergency medical technician, etc.), the local government, an agency (e.g., National Weather Service), an emergency manager of an entity (e.g., designated person in the emergency center of a hospital or campus), an automated system (e.g., a fire alarm, electronic sensors that detect toxic gas), an Emergency Operations Center (EOC), an on-site Incident Commander, public utility, or the like. For example, there may be a receiving point at the federal level for national warnings for the receipt of certain emergencies. Counties and local governments may have their own emergency management organization to serve counties and local tribunals, with an emergency manager at the county or local level that may monitor the receipt of emergency messages. Campuses may have a point of contact to support emergency management for a university that can monitor the generation of emergency messages and the related positional or time data.

The characteristics of the emergency event corroborated could be characteristics indicative of a vehicle-related emergency (e.g., car accident, bus failure, train fire, etc.), a weather emergency, such as a natural disaster, a geophysical emergency (e.g., landslide), a meteorological emergency (e.g., windstorms, tornados, hurricanes, tsunamis, lighting storms, thunderstorms, freezing rain, blizzards, fog), a health emergency that may be monitored by medical sensors, or the like.

Figure 2A:
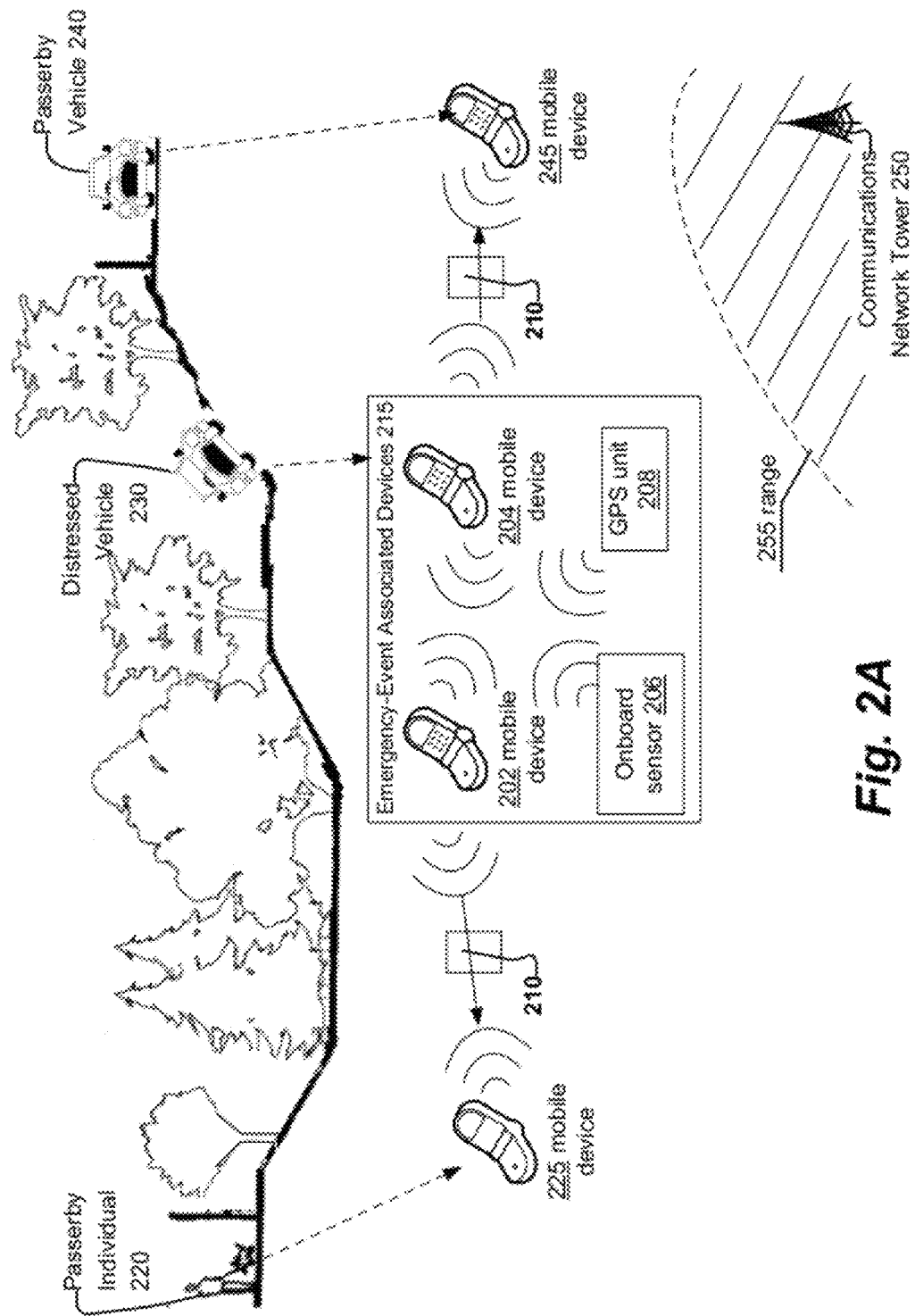
FIG. 2 depicts an example scenario and system of devices that utilize the disclosed techniques to transmit an emergency message.
Figure 2B:
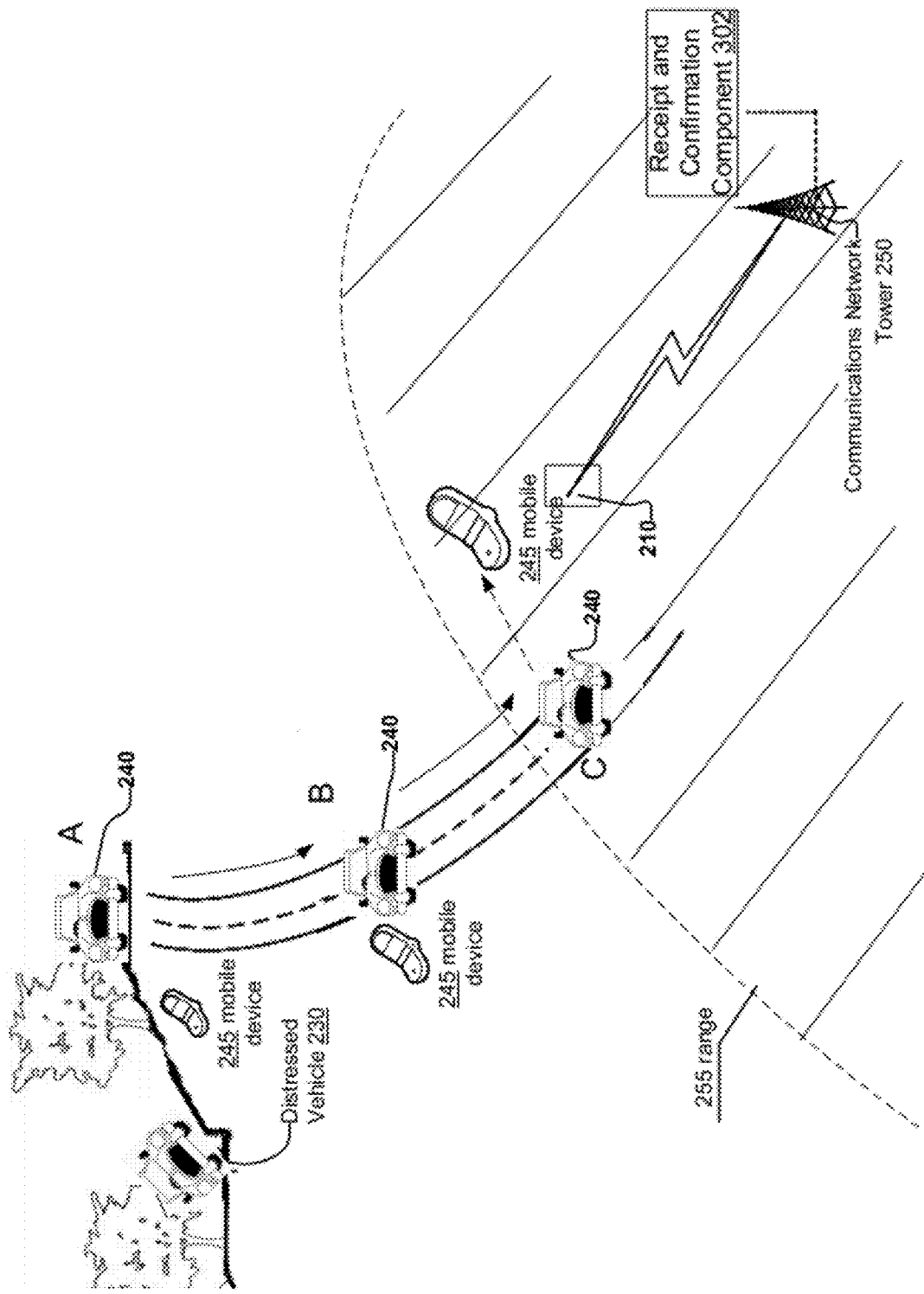

FIGS. 2A-2B depict an example scenario and system of devices that utilize the disclosed techniques to transmit an emergency message. The scenario depicts a distressed vehicle 230, a passerby vehicle 240, a passerby individual 220, a communications network tower 250 and the range of the communications network coverage 255.

The distressed vehicle 230 is involved in an incident and rolls down the embankment from the road, to a place that is not visible to those passing by, such as passerby vehicle 240 or passerby individual 220. The emergency-event associated devices 215 are the mobile devices associated, in some manner, with the vehicle accident. Mobile devices 202 and 204 are shown as cell phones that may, for example, each belong to an occupant of the vehicle 230. The onboard sensor 206 may detect and monitor a velocity of the vehicle 230, the orientation of the vehicle 230, the g-force of the vehicle, or other information related to the vehicle 230. The vehicle 230 may include devices capable of direct communications, such as Bluetooth capabilities. For example, the onboard sensor 206 can be capable of communicating via direct communication. The GPS unit 208 may be a portable device in the vehicle or installed in the dash of the vehicle 230, for example. As shown, none of the emergency-event associated devices 215 are within the range 255 of the communications network tower 250.

Passerby vehicle 240 is shown associated with a mobile device 245, which may be, for example, a cellular phone associated with an occupant of the passerby vehicle 240. Passerby individual 220 may be carrying a mobile device 225, also shown as a cellular phone. It is noted that cellular phones are common mobile devices found on a person, but is not meant to be a limiting disclosure, as the device as described herein may be any device capable of direct communications. Neither mobile device 225 nor 245 are shown within the range 255 of the communications network tower 250. Thus, none of the mobile devices depicted in FIG. 2 are, at this point, capable of communicating via the communications network.

Any of the plurality of devices 215 may communicate via device-to-device communication. Via the communication, information related to the emergency event may be shared. For example, mobile device 202 and 204 may have an accelerometer embedded that provides an indication of a sudden velocity change. The onboard sensor 206 may provide an indication that the vehicle is positioned on its side. The GPS unit 208 can provide the current and previous, for example, of GPS coordinates of the vehicle along with a timestamp. Together, if these four devices, 202, 204, 206, and 208, communicate, they may corroborate these characteristics that are indicative of an emergency event. The information may be compiled for the generation of a collaborated report message. At least one of the devices may have information stored in memory, such as an emergency event table, that compares the information collaborated to the characteristics of various emergency events. For example, the high velocity change, the orientation of the vehicle, and the change in GPS coordinates over time is consistent with a vehicular accident or incident that has caused an abnormal orientation of the vehicle as the result of an impact.

Either of mobile device 225 and 245 could also be associated with the emergency event. Although neither device may have been directly involved in the accident associated with the distressed vehicle 230, either device may comprise information that can be collaborated with the other available information for the generation of the emergency report message. For example, one of the mobile devices, 215, in FIG. 2 could attempt device-to-device communication within a certain limited proximity, which may be dictated based on the type of emergency event that is predicted. For example, for a vehicle incident, if passerby 220 was within 10 feet from distressed vehicle 230, the mobile device 225 on the passerby's 220 person might be identified as associated with the emergency event such that any information that can be provided by the device 225 may be used for the generation of the report message. Thus, the mobile device 225 might be used to add information for the generation of an emergency message, such as GPS information, if not otherwise available.

At least one of the plurality of devices that contributes information may generate an emergency report message based on the collaboration of information, and at least one of the plurality of devices may transmit the emergency report message. The message may include all available information related to the emergency event, such as the GPS information, velocity, car orientation, timestamps, etc. At least one of the plurality of devices shown in FIG. 2A, possibly the same one that generates the emergency message, may transmit the emergency message 210. In this example, each of devices 225 and 245 are not part of the collaboration (e.g., the devices may not have been in proximity at the time of collaboration, and thus are not identified as part of the emergency).

Devices 225, 245, are examples of phones within device-to-device range of a device transmitting a collaborated report message. Either device 225,245 can receive the emergency message from the selected transmitting device from the plurality of emergency-event associated devices 215. The device selected for transmission may be selected from the available emergency-event associated devices 215 for having particular characteristics. For example, mobile device 204 may be selected because it has the capabilities for the longest range of device-to-device communication, thereby increasing the chances that a passerby mobile device, such as mobile device 225 or 245, will come within range to receive the emergency message 210. The emergency message may be transmitted via device-to-device communication technology.

Any mobile devices within a suitable range may be configured to receive the emergency message 210. For example, mobile devices 225 and 245 may include software that enables them to receive and process an emergency message 210. Neither mobile device 225 nor 245 is shown within range 255 of the communications network tower 250. Thus, the mobile devices 225, 245 can store the emergency message such that if either device comes within range of a communications network tower 250, the message can be transmitted.

FIG. 2B depicts passerby vehicle 240 in its travels from the location proximate to the distressed vehicle, at which point the device 245 associated with the passerby vehicle was in direct communication range to receive the emergency message 210. As shown in FIG. 2B, passerby vehicle 240 and the associated mobile device 245 travel from point A to point B to point C. Upon detection by the device 245 that it has entered into the range of communication with the communications network tower at point C, the device 245 can transmit the emergency message via the communications network to an emergency personnel.

The communications network that manages or utilizes the communications network tower 250 may have a receipt and confirmation (RAC) component 302. The RAC component 302 may retrieve information from the emergency message, such as from a message header containing a unique ID related to the emergency event. The RAC component 302 can store the unique IDs received from any emergency messages. Upon receipt of an emergency message, the RAC component 302 may compare the unique ID in the incoming message to those stored. If the unique ID matches a stored unique ID, the RAC component 302 may determine if the emergency message has already been transmitted to emergency personnel. Furthermore, the RAC may determine if there is new information in the incoming emergency message, such that transmission of the message should continue to emergency personnel, despite having a unique ID that matches a stored unique ID.

If the emergency message is transmitted to emergency personnel, the RAC component 302 may deliver a confirmation back to mobile device 245 with such indication. The device 245 could transmit that information back to at least one of the emergency-event associated devices 215 that are associated with the distressed vehicle 230. For example, if the passerby vehicle 240 is making a trip to pick up another passenger, and in its travels the passerby vehicle 240 comes within direct communication range of the distressed vehicle 230, receives and stores the emergency message 210, continues to its destination and on the way, transmits the message via the communications network when it comes within a suitable range 255. Then, the passerby vehicle 240 takes the return path to the passerby vehicle's 240 starting point, such that the vehicle 240 may pass by the distressed vehicle 230 and the emergency event once again. A confirmation that the emergency message 210 has been transmitted via a communications network to emergency personnel may be provided to one of the emergency-event associated devices. Thus, the transmission by the emergency-event associated devices may be terminated upon receipt of this confirmation. The processing of comparing unique IDs and providing confirmation may limit the number of unnecessary transmission of the emergency message 210.

The mobile devices associated with those passing by, such as mobile devices 225 and 245, may be configured with hardware or software that supports the receipt and transmission of the emergency messages of the type disclosed herein. For example, a mobile device 245 may have installed on it a program that supports the receipt of an emergency message via device-to-device communication. The mobile device 245 can have a memory for storing the emergency message and a processor for recognizing that the phone has entered the range of a communications network.

The program that supports receipt/transmission of an emergency-message may be available only for a mobile device that is part of a subscribing network or subscribes to this particular service. Alternately, the program could be installed on any type device that can communicate device-to-device or any type of device that can communicate via communications network communications. If not all of the phones or devices have a proper subscription, the combination of devices may still collaborate information and a subscribing phone can send the emergency-event information. In some cases, different communications networks providers have different communications networks towers. Therefore, mobile devices that are associated with differing towers or with a different communications network provider can still communicate and collaborate information if they have the proper software to support the disclosed techniques. The messages may be formatted such that any mobile devices can receive the alert regardless of the associated service provider.

The functionality of processing/receiving/transmitting an emergency message, from any of the mobile devices, can be transparent to the user. Thus, a mobile device 245 could store and carry and emergency message into the communications network without any indication to the user that the processing/receiving/transmitting is taking place. Alternately, emergency personnel, such as police officers, can receive an emergency message via a mobile device that has capabilities to view/display the emergency message. Thus, if an authorized public servant is in device-to-device communication range, the public servant can receive notification of an emergency event despite not being within range of a communications network. If the emergency message has been routed to a communications network via the device-to-device communications disclosed herein, the network may identify public servants that are closest to the emergency and provide a notification via the public servant's mobile device or other method of communicating.

Figure 3:
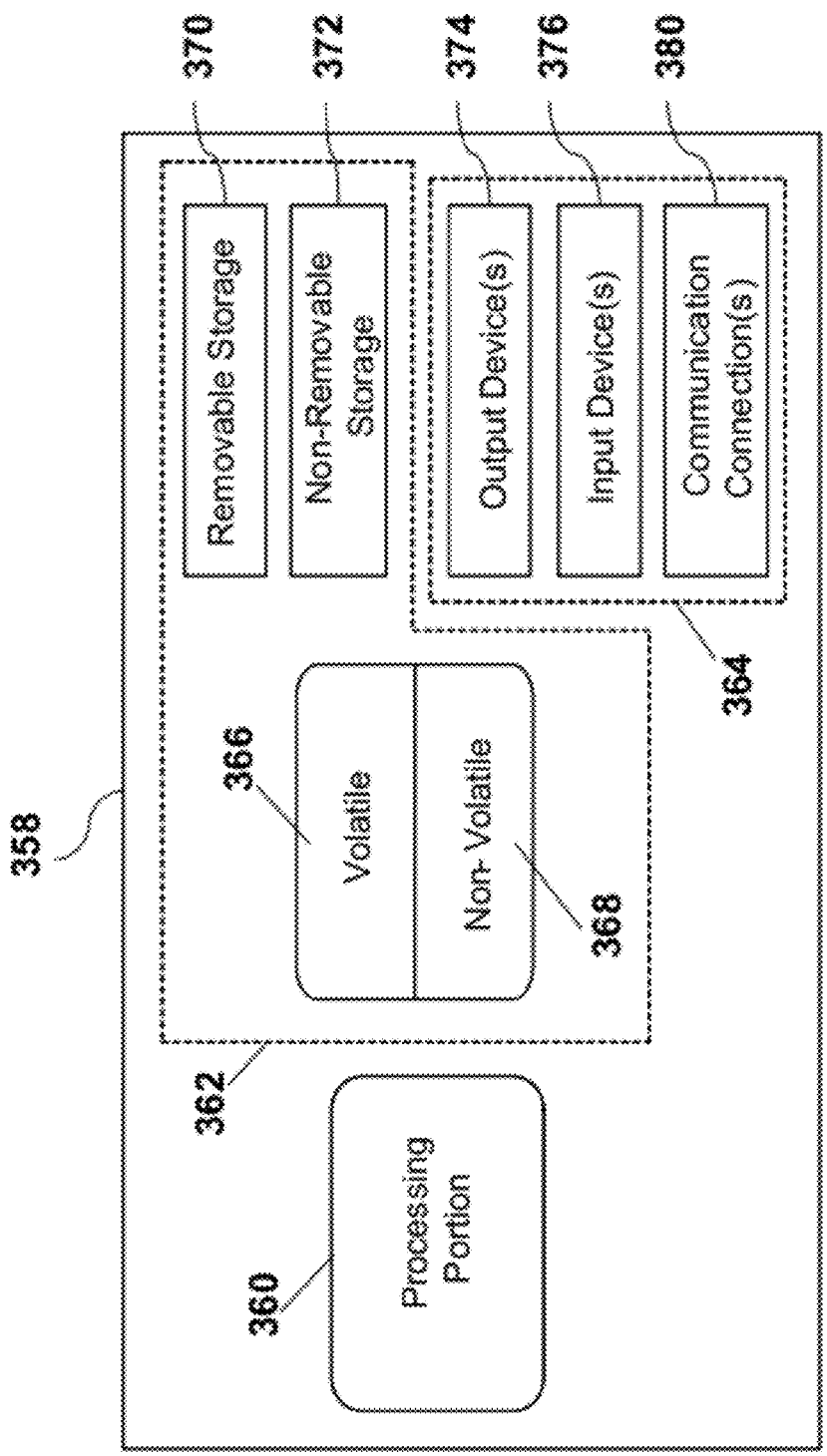
FIG. 3 is a block diagram of an example processor which may be employed in any of the embodiments disclosed herein.

FIG. 3 is a block diagram of an example processor 358 which may be employed in any of the embodiments described herein, including as one or more components of a mobile device such as devices 102, 104, 106, 112, 114 from FIG. 1, or mobile devices 202, 204, 206, 208, 225, or 245 from FIG. 2, for example, and/or as one or more components of communications network equipment or related equipment, such as ESME 142, ESC 140, GMLC 136, MSC 134, LMU 124, and/or SMLC 122. It is emphasized that the block diagram depicted in FIG. 3 is exemplary and not intended to imply a specific implementation. Thus, the processor 358 can be implemented in a single processor or multiple processors. Multiple processors can be distributed or centrally located. Multiple processors can communicate wirelessly, via hard wire, or a combination thereof.

The processor 358 comprises a processing portion 360, a memory portion 362, and an input/output portion 364. The processing portion 360, memory portion 362, and input/output portion 364 are coupled together (coupling not shown in FIG. 3) to allow communications therebetween. The input/output portion 364 is capable of generating and/or receiving components utilized to store emergency messages, receive and/or transmit emergency messages, receive a confirmation or verification of message transmission, or the like. For example, the input/output portion 364 is capable of device-to-device communications with another device or via a communications network for receiving/providing a generated emergency message, accepting/receiving requests for emergency services from device 110, transmitting/receiving requests for emergency services, processing requests for emergency services, and executing programs and applications related to the emergency services requests and the determination of devices or parties associated with a device transmitting an emergency services request, transmitting/receiving an emergency message, or any combination thereof, as described above, The processor 358 can be implemented as a client processor and/or a server processor. In a basic configuration, the processor 359 may include at least one processing portion 360 and memory portion 362. The memory portion 362 can store any information utilized in conjunction with transmitting, receiving, and/or processing collaborated emergency-event information, such as GPS information, identification of the collaborating emergency-event associated devices, and/or processing associated communications. For example, depending on the device, as described above, the memory portion is capable of storing emergency messages, the processing portion may identify when the mobile device is within range of a communications network, and the input/output portion can transmit the message.

Depending upon the exact configuration and type of processor, the memory portion 362 can be volatile (such as RAM) 366, non-volatile (such as ROM, flash memory, etc.) 368, or a combination thereof. The processor 358 can have additional features/functionality. For example, the processor 358 can include additional storage (removable storage 370 and/or non-removable storage 372) including, but not limited to, magnetic or optical disks, tape, flash, smart cards or a combination thereof. Computer storage media, such as memory and storage elements 362, 370, 372, 366, and 368, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 358. Any such computer storage media can be part of the processor 358.

The processor 358 can also contain the communications connection(s) 380 that allow the processor 358 to communicate with other devices, for example via device-to-device communication or through network 120. Communications connection(s) 380 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land-line telephone, and wireless media such as acoustic, RF, infrared, cellular, and other wireless media. The term computer readable media as used herein includes both storage media and communication media. The processor 358 also can have input device(s) 376 such as keyboard, keypad, mouse, pen, voice input device, touch input device, etc. Output device(s) 374 such as a display, speakers, printer, etc. also can be included.

Figure 4:
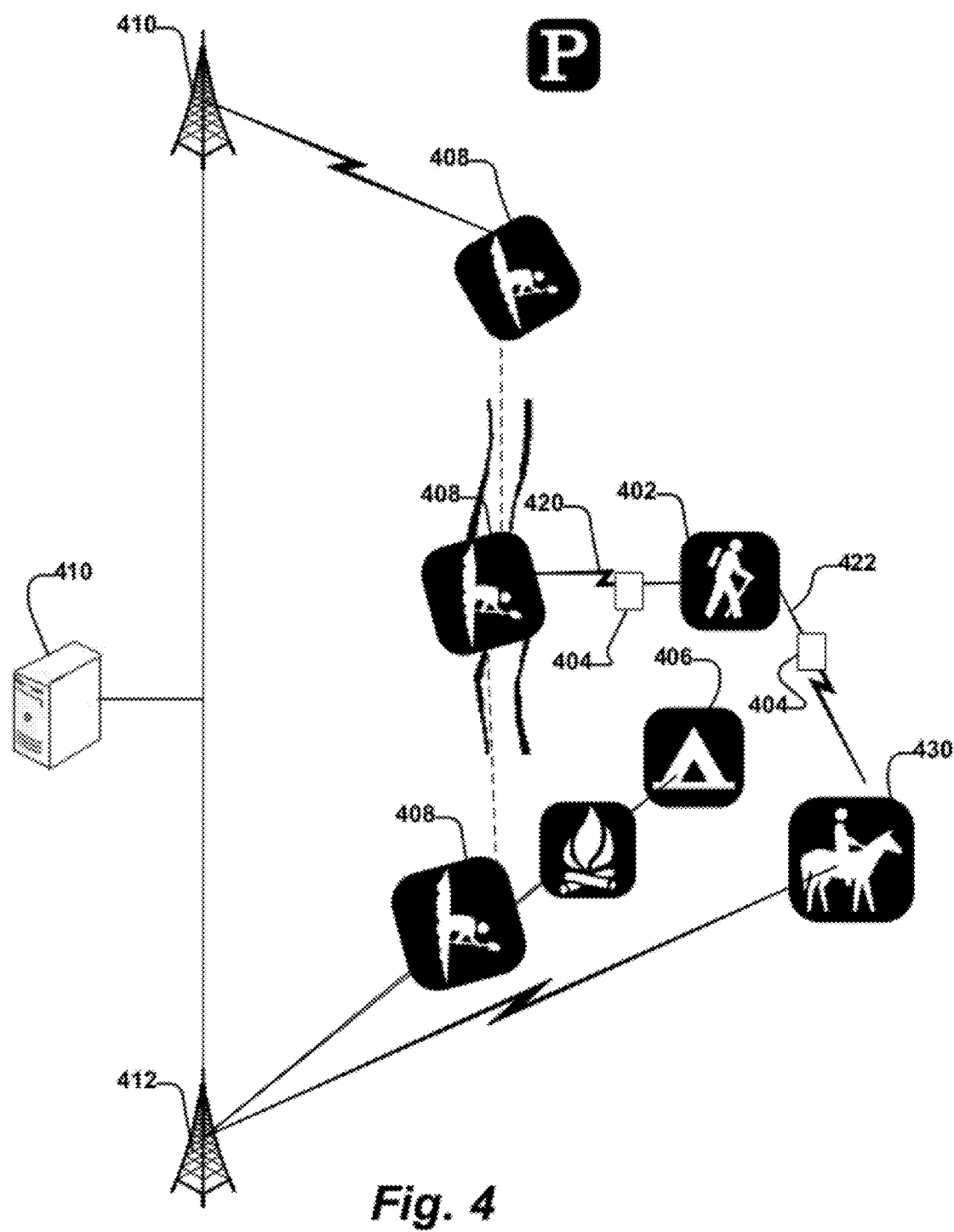
FIG. 4 depicts numerous examples of scenarios that may benefit by the disclosed techniques.

FIG. 4 depicts numerous examples of scenarios that may benefit by the disclosed techniques. In an example scenario, two individuals, represented by 402 may be mountain climbing, and one individual falls. The fallen individual's mobile communications device may identify that an impact has occurred as a result of the fall and the second individual could send a distress signal from a mobile device. In combination, the collaboration of the distress signal and the impact identification may be packaged in an emergency message 404.

In this example scenario, the emergency message 404 can also indicate a confidence rating of the corroboration of an emergency event, where one device indicates a distress situation and the second device indicates a high impact. Possibly one of the two mobile devices or a third mobile device located in device-to-device communication range can provide positional data such as GPS coordinates. The third mobile device 406 may be associated to one of the two individuals 402 or be associated with a third individual, such as that belonging to a camper at campsite 406, that may or may not even realize that he/she is in proximity to the other two individuals 402 or an emergency event. Together, the collaborated emergency-event information can be used to generate a message 404 that, if received by emergency personnel, can prepare them for a proper response to the emergency situation.

The emergency message 404 may be broadcast or transmitted via device-to-device communication by one of the devices at 420 and 422. If the emergency message 404 is received by any third mobile device, that mobile device may have access to the communications network or carry the message until the mobile device enters a range of a communications network. For example, a mobile device of a kayaker 408 traveling between points A, B, and C, an receive the broadcast emergency message when it enters a device-to-device communication range with either device associated with users 402. Similarly, another mobile device can receive the message, such as a device associated with a nearby horseback rider 430. Both the mobile device associated with the kayaker 408 and the horseback rider 430 can attempt to transmit the message over a communications network if within range. Otherwise, the mobile devices can hold the message until the receiving mobile device comes within device-to-device communication of other mobile devices or within range of the communications network, represented by communications towers 410 and 412. A communications network server, managed by a communications network provider, for example, may receive the emergency message and determine whether and to whom to transmit the message.

Thus, the corroboration and collaboration of the information between devices provides increased confidence that an emergency event has occurred and enriched information about the occurrence. The third mobile device acts as an intermediary to get the emergency message 404 to an appropriate authority. Similar results could occur for any emergency event. For example, a surfer or a scuba diver lost at sea may transmit an emergency message via a mobile device and a mobile device on a boat passing by could pick up and carry the emergency message for further transmission. Triggers of emergency events are not limited to mobile devices that are personal cell phones. Shopping malls, buildings, schools, and other facilities could provide emergency data related to localized emergency events.

A component of the communications standard may set parameters necessary to keep local emergency information from accidentally spreading beyond the current locale. This method can use the short range nature of Bluetooth to its benefit. Emergency messages would be limited to a set number of relay "hops" defined by the standard. A time delay could allow false-positives to simply fade away. Potential emergency information could be severe weather, earthquake, police emergency, or fire. Bluetooth is a common method of device-to-device communication, as described herein, since increasing large numbers of cell phones have this capability; however, any suitable method of device-to-device communication may be employed.

Figure 5:
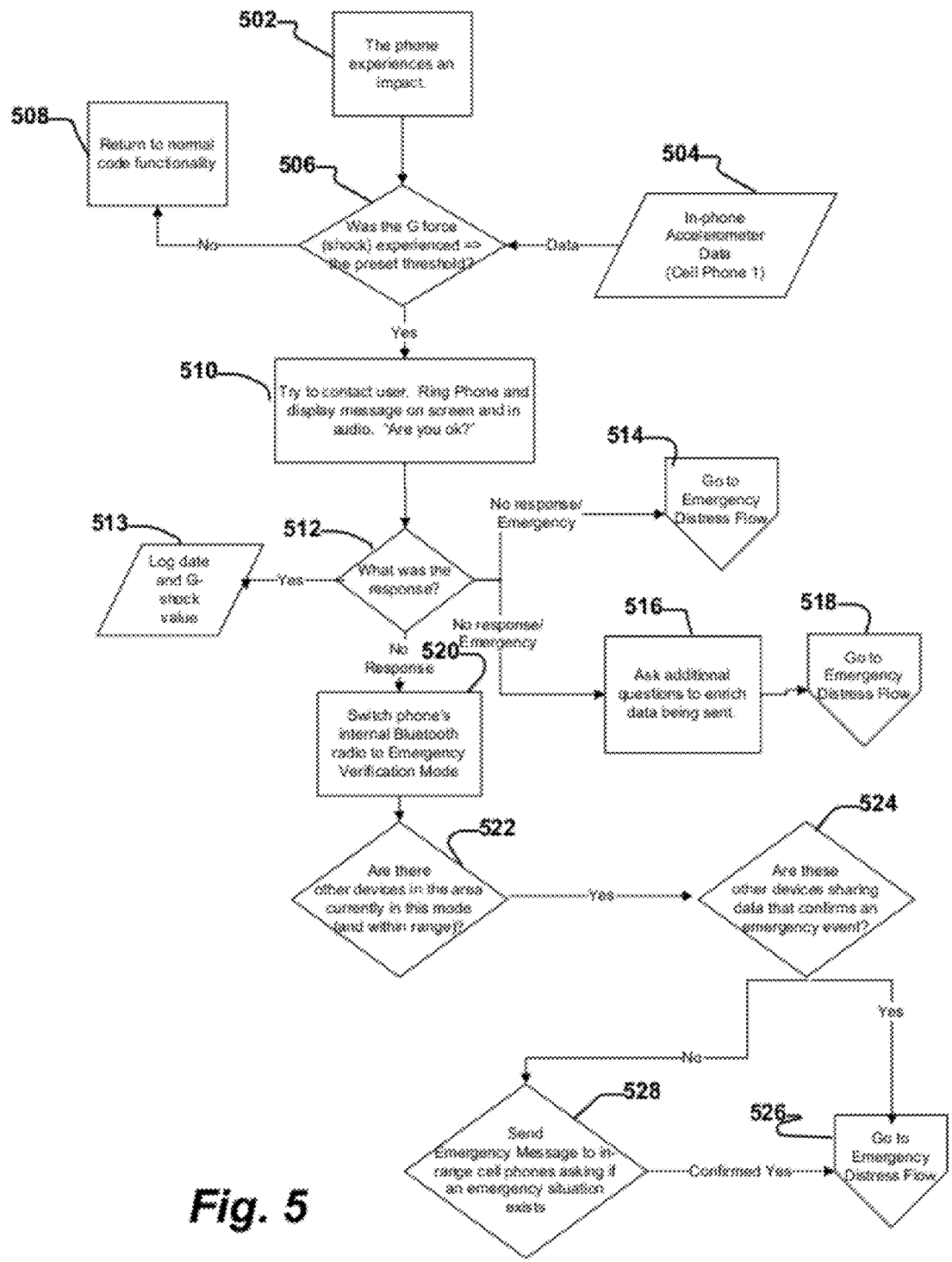
FIG. 5 depicts an example flow diagram of the handling of an emergency event according to the disclosed techniques.

FIG. 5 depicts an example flow diagram of the handling of an emergency event according to the disclosed techniques. At 502, an impact to a mobile device (e.g., a phone) is identified. Using information from an in-phone accelerometer, from 504, a processor within the phone may calculate the G-force at 506 to determine if the G-force reaches a preset threshold amount. Because cell phones are often dropped, for example, a preset G-force can be set to more assuredly identify a G-force that is associated with an emergency event and not just a dropped cell phone. If the G-force threshold is not met, the mobile device may return to normal functionality at 508.

If a preset G-force threshold is met, at 510, the mobile device may have functionality for contacting the user for user input. The phone may ring or display a message on the screen, requesting that the user confirm or deny an emergency event. In this example, if the user verifies that there is no emergency at 512, such as by responding that there is no emergency to a displayed message, the mobile device may log the date and store information at 513 that triggered the process beginning at 502.

Figure 6:
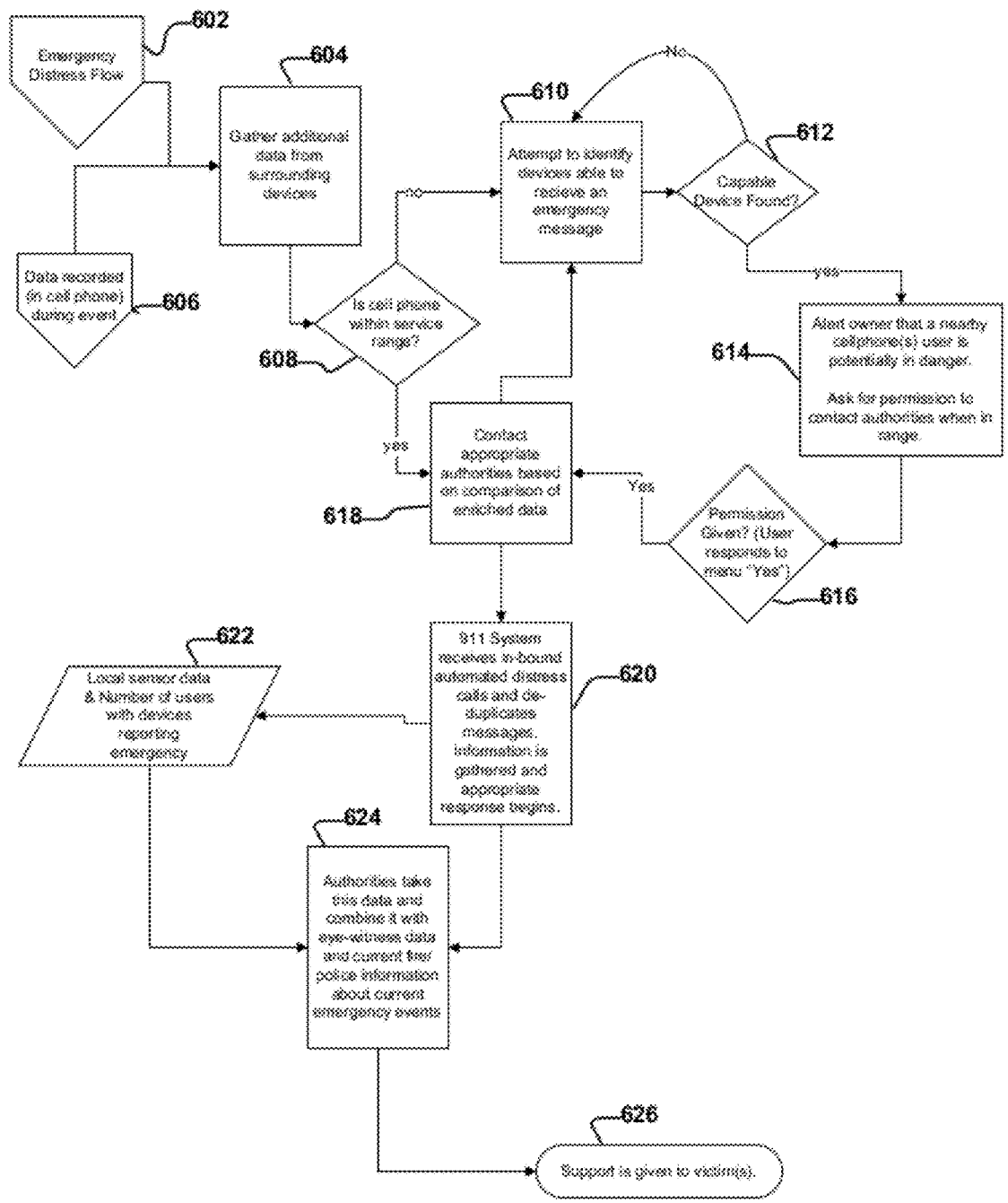
FIG. 6 depicts example emergency distress flow, typically initiated following the confirmation of an occurrence of an emergency event.

At 512, if there is a determination of no response or the confirmation of an emergency, the processing may continue at 514 to the emergency distress flow shown in FIG. 6, or ask additional questions of the user at 516 and then proceed, at 518, to the emergency distress flow shown in FIG. 6. If the determination of the user response is "no response," then the mobile device may switch the phone's internal Bluetooth radio (or other device-to-device communication capability) to Emergency Verification Mode at 520. The mode could be a standard Bluetooth pairing and communication method and may employ encryption and passwords as necessary for security measures. The Emergency Verification Mode could be initiated by software installed on the phone associated with the emergency handling techniques disclosed herein. The Emergency Verification Mode could be a method by which other mobile devices within device-to-device communication could recognize, receive signals identifying the emergency mode, and pair and share data. The mode could be an industry-wide standard by which various mobile devices could communicate, even if different communications providers are involved.

At 522, the mobile device may determine if other devices in the area are currently operating in Emergency Verification Mode. For example, other devices could be emergency-event associated devices, including other phones, premise-based sensors that can provide additional data, or the like. Premise-based sensors could include earthquake sensors, building structure damage sensors, or other environmental sensors that can be used to collaborate with information from the other mobile devices and/or corroborate the occurrence of an emergency event. Responsive to the determination at 522, the determination at 524 is whether or not the other mobile devices are sharing information for collaboration. If yes, then the method may continue, at 526 to the emergency distress flow shown in FIG. 6, starting at 602.

If the determination at 522 is no, the mobile device can send an emergency message to in-range cell phones asking if an emergency situation exists (e.g., by displaying a message to the user) and/or requesting information that may enrich the emergency message to be transmitted (e.g., GPS information from a GPS-capable phone). Via the collaboration of information at 528 that confirms the likelihood of an emergency event, the method proceeds at 526 to the emergency distress flow shown in FIG. 6, starting at 602.

FIG. 6 depicts example emergency distress flow, typically initiated following the confirmation of an occurrence of an emergency event. At 602, the identification of an emergency distress flow leads to a gathering of additional information from surrounding mobile devices at 604, which includes the data at 606 recorded in the mobile device that initiated the method for emergency distress. The gathering of information may be limited to those associated to the emergency event, which may be indicated by other devices in an Emergency Communications Mode, as described with respect to FIG. 5.

At 608, a determination is made, such as by a communications component or a processor in the mobile device, whether or not the cell phone is within range of a communications network. If the mobile device is not within range of a communication network, at 610 the mobile phone can attempt to identify devices able to receive an emergency message. The mobile phone may simply transmit or broadcast the emergency message via device-to-device communication and available devices that are able to receive an emergency message that are within device-to-device communication range can receive the emergency message. A device may be capable of receiving an emergency message if it is configured appropriately, such as having the appropriate software or emergency Bluetooth capabilities. If a capable device is not found, at 612, the mobile phone may continue attempting, at 610, to locate mobile devices within device-to-device range with capabilities to receive an emergency message.

If a capable device is found at 612, the capable mobile device may alert the user associated with the capable device has identified a nearby, potential emergency event. The capable device may be programmed to get authorization from the user at 6161 to contact authorities or transmit the emergency message. Alternately, the capable mobile device may process the emergency event information transparently to the user of the capable device. Either way, if the processing is transparent to the user or authorization is obtained at 616, at 618 the proper authorities can receive the emergency message via the communication network when the capable device comes within range or if the distressed mobile device is within range (from 608).

As described above, the emergency message may be enriched based on the collaboration of information from emergency-event associated devices. At 620, an emergency system, such as the 911 emergency system, may receive inbound distress calls and duplicate messages, originating from the emergency event. At 622, local sensor data and any number of users with mobile devices can report information about the emergency, such as the type of emergency. At 624, proper authorities may receive the information from 620 and 622 and further combine it with eye-witness data and current fire/police information about current emergency events. Together, the information may provide extensive information about the emergency event, making it possible to enable the proper authorities to properly respond to the event, giving support to the victims at 626.

The cellular radio network and/or the wireless broadcast network depicted herein can comprise any appropriate telephony radio network. The Emergency Alert Network depicted herein can comprise any appropriate emergency alert network, such as a telephony radio network, for example. Further, techniques for the delivery of emergency alerts can be implemented with appropriate telephony radio networks. The following description sets forth some exemplary telephony radio networks, such as the global system for mobile communications (GSM), and non-limiting operating environments. The below-described operating environments should be considered non-exhaustive, however, and thus the below-described network architectures merely show how techniques for the delivery of emergency alerts can be incorporated with existing network structures and architectures. It can be appreciated, however, that the techniques for the delivery of emergency alerts can be incorporated with existing and/or future alternative architectures for communication networks as well.

The global system for mobile communication ("GSM") is one of the most widely-used wireless access systems in today's fast growing communication systems. GSM provides circuit-switched data services to subscribers, such as mobile telephone or computer users, for example. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications. For purposes of explanation, various embodiments are described herein in connection with GSM. The references to GSM are not exclusive, however, as it should be appreciated that embodiments may be implemented in connection with any type of wireless access system such as, for example, CDMA or the like.

As may be appreciated, the example GSM/GPRS environment and services described herein can also be extended to 3 G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that shall become available in time. In this regard, the techniques of the various embodiments discussed below may be applied independently of the method of data transport, and does not depend on any particular network architecture, or underlying protocols.

Figure 7:
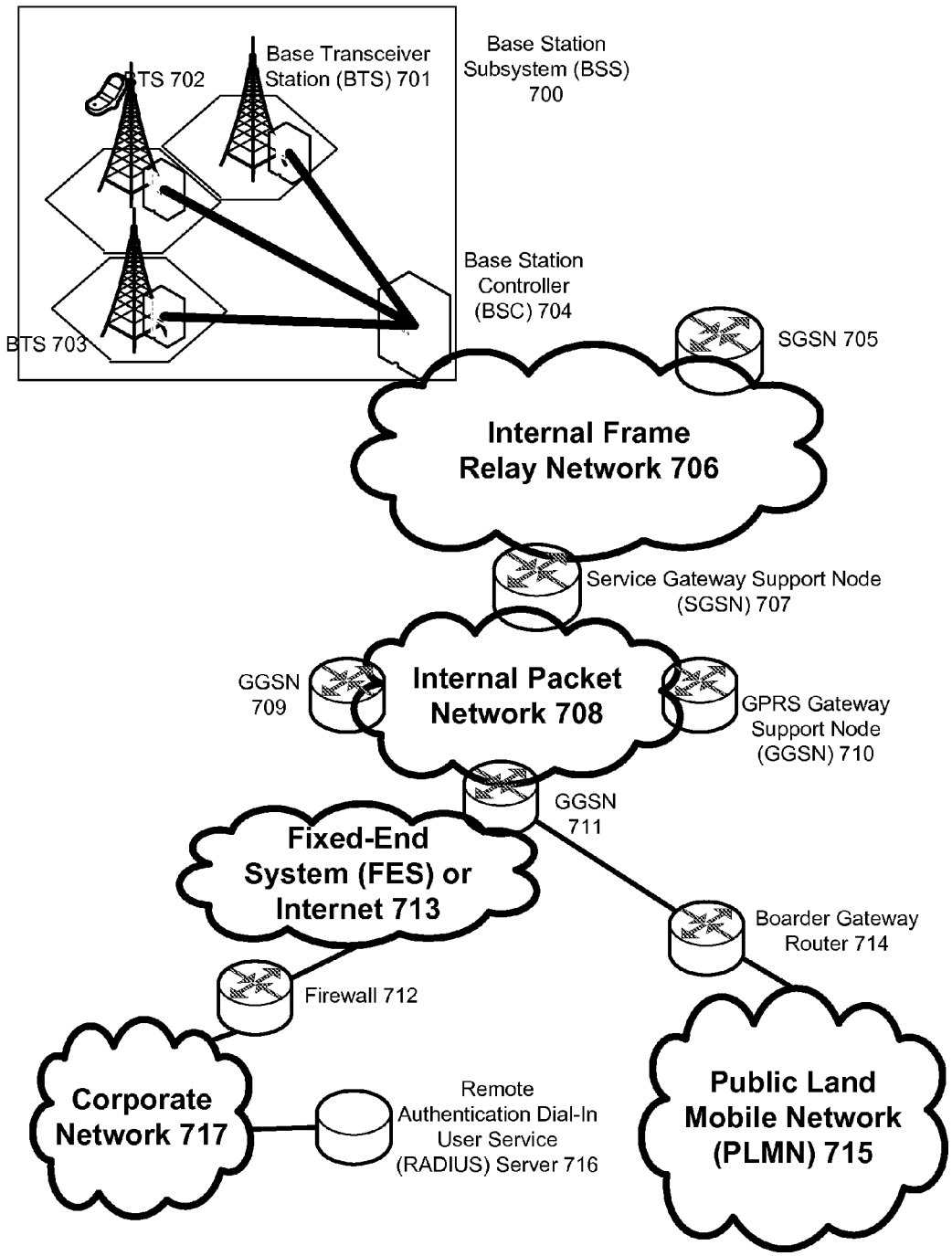
FIG. 7 illustrates an example alternate block diagram of an exemplary GSM/GPRS/IP multimedia network architecture in which medical information access techniques may be incorporated.

FIG. 7 depicts an overall block diagram of an example packet-based mobile cellular network environment, such as a GPRS network, in which aspects of an embodiment may be practiced. In such an environment, there may be any number of subsystems that implement the functionality of the environment such as, for example, a plurality of Base Station Subsystems ("BSS") 700 (only one is shown in FIG. 7), each of which comprises a Base Station Controller ("BSC") 704 serving a plurality of Base Transceiver Stations ("BTS") such as, for example, the BTSs 701, 702 and 703. may be the access points where users of packet-based mobile devices become connected to the wireless network. In an embodiment, the packet traffic originating from user devices is transported over the air interface to the BTS 703, and from the BTS 703 to the BSC 704. Base station subsystems, such as the BSS 700, may be a part of internal frame relay network 706 that may include Service GPRS Support Nodes ("SGSN") such as the SGSN 705 and 707. Each SGSN 705, 707, etc. may be in turn connected to an internal packet network 708 through which the SGSN 705, 707, etc. can route data packets to and from a plurality of gateway GPRS support nodes (GGSN) 222, 711, 710, etc.

As illustrated, the SGSN 707 and the GGSNs 222, 711 and 710 may be part of the internal packet network 708. Gateway GPRS serving nodes 222, 711 and 710 may provide an interface to external Internet Protocol ("IP") networks such as Public Land Mobile Network ("PLMN") 715, corporate intranets 717, Fixed-End System ("FES"), the public Internet 713 and/or the like. As illustrated, subscriber corporate network 717 may be connected to the GGSN 711 via a firewall 712; and the PLMN 715 may be connected to the GGSN 711 via a boarder gateway router 714. A Remote Authentication Dial-In User Service ("RADIUS") server 716 may be used for caller authentication when a user of a mobile cellular device calls corporate network 717, for example.

Generally, there may be four cell sizes in a GSM network-macro, micro, pico and umbrella cells. The coverage area of each cell is different in different environments. Macro cells may be regarded as cells where the base station antenna is installed in a mast or a building above average roof top level. Micro cells may be cells whose antenna height is under average rooftop level; they are typically used in urban areas. Pico cells may be small cells having a diameter is a few dozen meters; they may be mainly used indoors. On the other hand, umbrella cells may be used to cover shadowed regions of smaller cells and fill in gaps in coverage between those cells.

Figure 8:
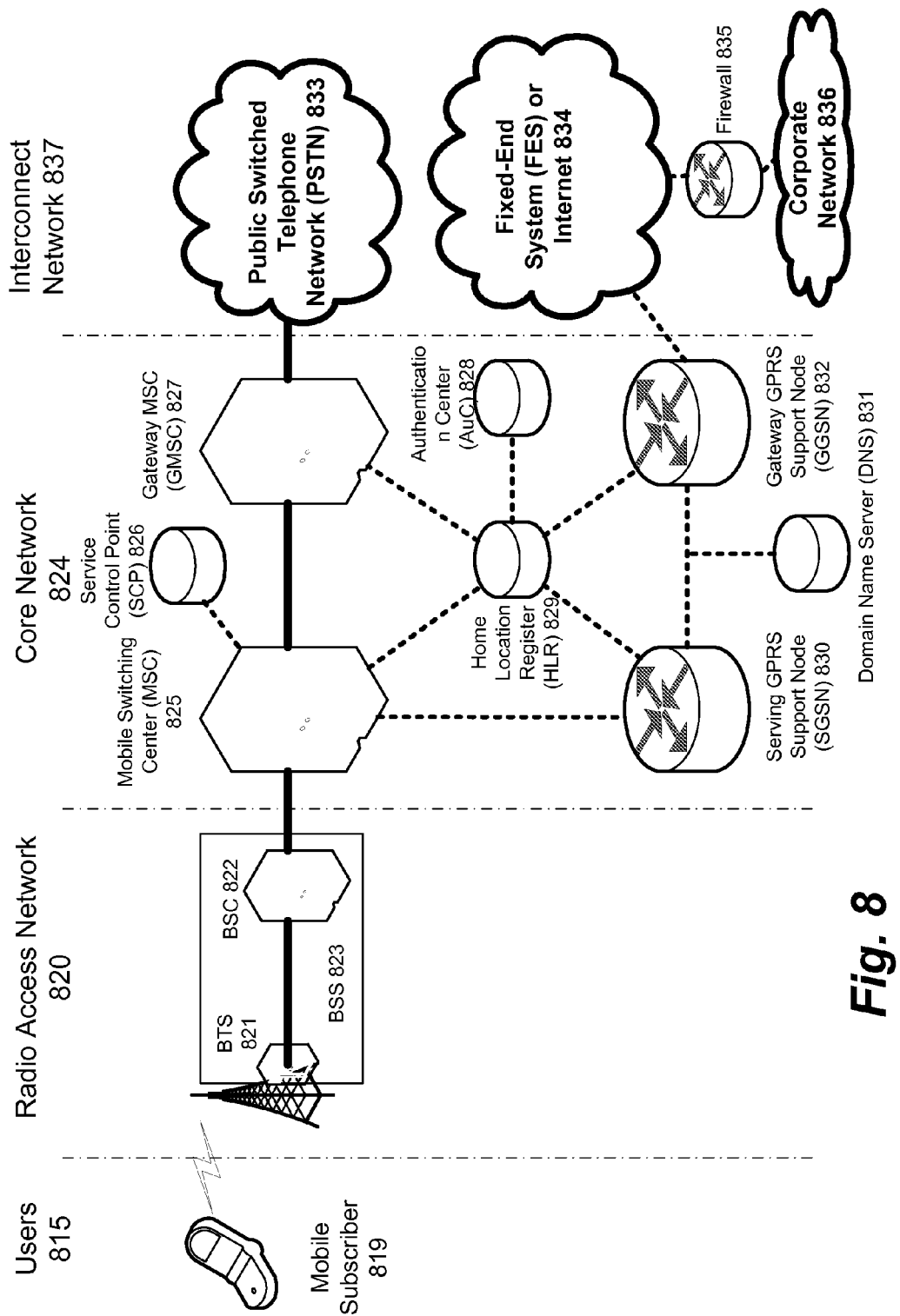
FIG. 8 illustrates another exemplary block diagram view of a GSM/GPRS/IP multimedia network architecture.

FIG. 8 illustrates the architecture of a typical GPRS network as segmented into four areas: users 815, radio access network 820, core network 824 and interconnect network 837. The users area 815 may include a plurality of end users. The radio access network are 820 may include a plurality of base station subsystems such as the BSSs 823, which include BTSs 821 and BSCs 822. The core network are 824 may include a host of various network elements. As illustrated here, the core network 824 may include a Mobile Switching Center ("MSC") 825, a Service Control Point ("SCP") 826, a gateway MSC 827, a SGSN 830, a Home Location Register ("HLR") 829, an Authentication Center ("AuC") 828, a Domain Name Server ("DNS") 831 and a GGSN 832. The interconnect network area 837 also may include networks and network elements. As illustrated in FIG. 8, the interconnect network are 837 may include a Public Switched Telephone Network ("PSTN") 833, a Fixed-End System ("FES") and/or the Internet 834, a firewall 835 and/or a Corporate Network 836.

A mobile switching center 825 may be connected to a large number of base station controllers. At MSC 825, for example, depending on the type of traffic, the traffic may be separated such that voice may be sent to Public Switched Telephone Network ("PSTN") 833 through Gateway MSC ("GMSC")

827, and/or data may be sent to the SGSN 830, which then sends the data traffic to the GGSN 832 for further forwarding.

When the MSC 825 receives call traffic, for example, from the BSC 822, it may send a query to a database hosted by the SCP 826. The SCP 826 may process the request and may issue a response to the MSC 825 so that it may continue call processing as appropriate.

The HLR 829 may be a centralized database for users to register with the GPRS network. The HLR 829 may store static information about the subscribers such as the International Mobile Subscriber Identity ("IMSI"), subscribed services, and/or a key for authenticating the subscriber. The HLR 829 may also store dynamic subscriber information such as the current location of the mobile subscriber. Associated with HLR 829 may be an AuC 828. The AuC 828 may be a database that contains the algorithms for authenticating subscribers and may include the associated keys for encryption to safeguard the user input for authentication.

In the following, depending on context, the term "mobile subscriber" may refer to either the end user or to the actual portable device used by an end user of the mobile cellular service. When a mobile subscriber turns a mobile device, the mobile device goes through an attach process by which the mobile device attaches to a SGSN of the GPRS network. Referring now to FIG. 8, mobile subscriber 819 may initiate the attach process by turning on the network capabilities of the mobile device. An attach request may be sent by the mobile subscriber 819 to the SGSN 830. The SGSN 830 may query another SGSN, to which the mobile subscriber 819 may have been attached before, for the identity of the mobile subscriber 819. Upon receiving the identity of the mobile subscriber 819 from the other SGSN, the SGSN 830 may request more information from the mobile subscriber 819. This information may be used to authenticate the mobile subscriber 819 to the SGSN 830 by the HLR 829. Once the mobile subscriber 819 is verified, the SGSN 830 may send a location update to the HLR 829 indicating the change of location to a new SGSN, in this case the SGSN at 830. The HLR 829 may notify the old SGSN, to which the mobile subscriber 819 was attached, to cancel the location process for the mobile subscriber 819. The HLR 829 may then notify the SGSN 830 that the location update has been performed. At this time, the SGSN 830 may sends an "Attach Accept" message to the mobile subscriber 819, which in turn, may send an "Attach Complete" message to the SGSN 830.

After the attaching process, the mobile subscriber 819 may enter an authentication process. In the authentication process, the SGSN 830 may send authentication information to the HLR 829, which may send information back to the SGSN 830 based on the user profile that was part of the user's initial setup. The SGSN 830 may then send a request for authentication and ciphering to the mobile subscriber 819. The mobile subscriber 819 may use an algorithm to send the user identification (ID) and/or a password to the SGSN 830. The SGSN 830 may use the same algorithm to compare the result. If a match occurs, the SGSN 830 may authenticate the mobile subscriber 819.

Next, the mobile subscriber 819 may establish a user session with the destination network, for example, the corporate network 836, by going through a Packet Data Protocol ("PDP") activation process. The mobile subscriber 819 may request access to the Access Point Name ("APN"), for example, UPS.com, and the SGSN 830 may receive the activation request from the mobile subscriber 819. The SGSN 830 may then initiate a Domain Name Service ("DNS") query to learn which GGSN node has access to the UPS.com APN. The DNS query may be sent to the DNS server 831 within the core network 824 which may be provisioned to map to one or more GGSN nodes in the core network 824. Based on the APN, the mapped GGSN 832 may access the requested corporate network 836. The SGSN 830 may then send to the GGSN 832 a Create Packet Data Protocol ("PDP") Context Request message. The GGSN 832 may send a Create PDP Context Response message to the SGSN 830, which may then send an Activate PDP Context Accept message to the mobile subscriber 819.

Once activated, data packets of the call made by the mobile subscriber 819 may then go through radio access network 820, core network 824, and interconnect network 837, to reach corporate network 836.

Figure 9:
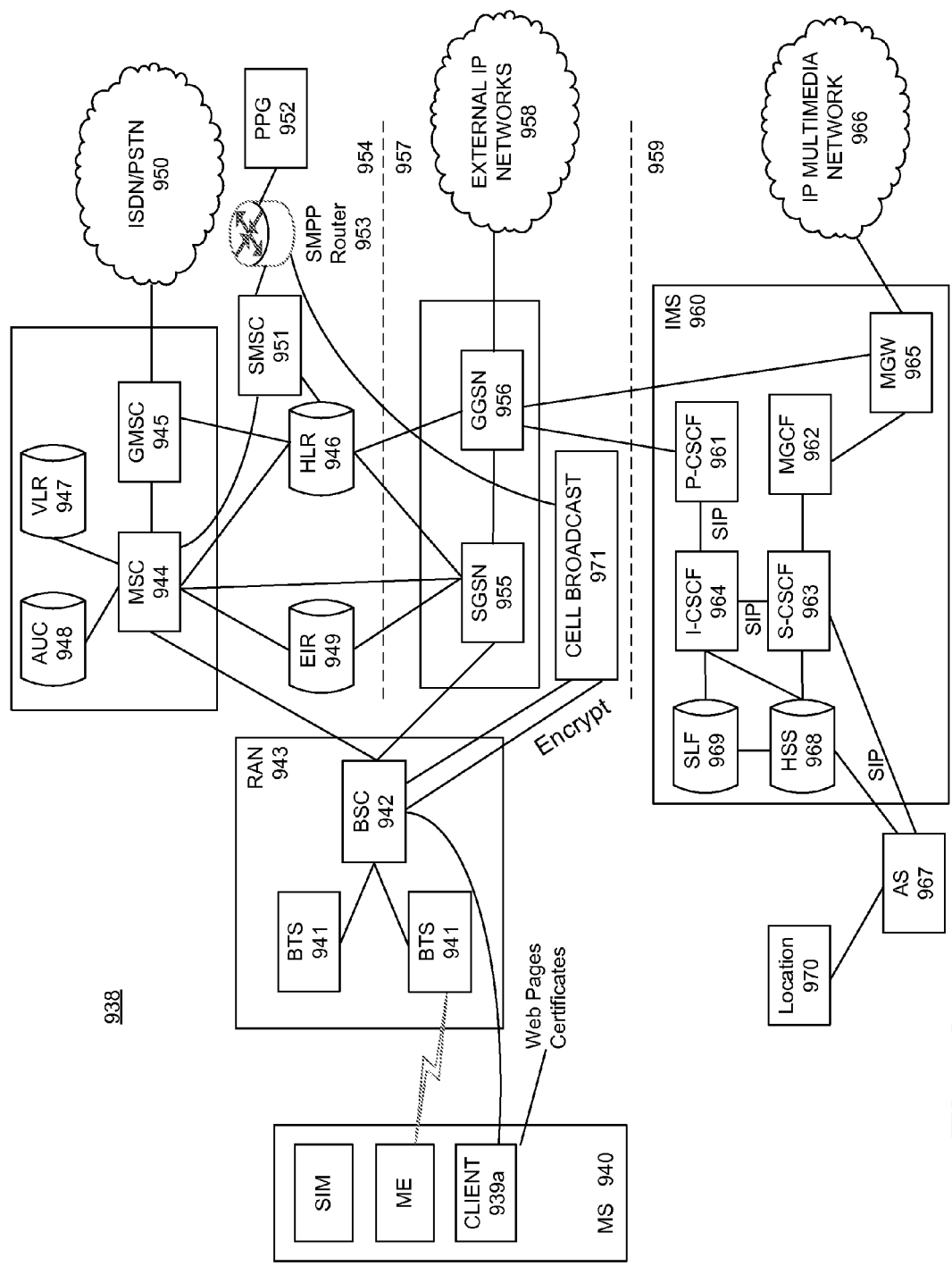
FIG. 9 depicts an overall block diagram of an exemplary packet-based mobile cellular network environment, such as a GPRS network.

FIG. 9 shows another example block diagram view of a GSM/GPRS/IP multimedia network architecture 938. As illustrated, the architecture 938 of FIG. 9 includes a GSM core network 954, a GPRS network 957 and/or an IP multimedia network 959. The GSM core network 954 may include a Mobile Station (MS) 940, at least one Base Transceiver Station (BTS) 941, and/or a Base Station Controller (BSC) 942. The MS 940 may be Mobile Equipment (ME), such as a mobile phone and/or a laptop computer 202c that is used by mobile subscribers, with a Subscriber identity Module (SIM). The SIM may include an International Mobile Subscriber Identity (IMSI), which may include a unique identifier of a subscriber. The BTS 941 may be physical equipment, such as a radio tower, that enables a radio interface to communicate with the MS 940. Each BTS may serve more than one MS 940. The BSC 942 may manage radio resources, including the BTS 941. The BSC 942 may be connected to several BTS 941. The BSC 942 and BTS 941 components, in combination, are generally referred to as a base station (BS) and/or a radio access network (RAN) 943.

The GSM core network 954 may include a Mobile Switching Center (MSC) 944, a Gateway Mobile Switching Center (GMSC) 945, a Home Location Register (HLR) 946, a Visitor Location Register (VLR) 947, an Authentication Center (AuC) 949, and an Equipment Identity Register (EIR) 948. The MSC 944 may perform a switching function for the network. The MSC may performs other functions, such as registration, authentication, location updating, handovers, and call routing. The GMSC 945 may provide a gateway between the GSM network and other networks, such as an Integrated Services Digital Network (ISDN) or a Public Switched Telephone Network (PSTN) 950. In other words, the GMSC 945 may provide interworking functionality with external networks.

The HLR 946 may include a database that contains administrative information regarding each subscriber registered in a corresponding GSM network. The HLR 946 may contain the current location of each mobile subscriber. The VLR 947 may include a database that contains selected administrative information from the HLR 946. The VLR may contain information necessary for call control and provision of subscribed services for each mobile subscriber currently located in a geographical area controlled by the VLR 947. The HLR 946 and the VLR 947, together with MSC 944, may provide call routing and roaming capabilities of the GSM network. The AuC 948 may provide parameters for authentication and/or encryption functions. Such parameters may allow verification of a subscriber's identity. The EIR 949 may store security-sensitive information about the mobile equipment.

The Short Message Service Center (SMSC) 951 may allow one-to-one Short Message Service (SMS) messages to be sent to/from the mobile subscriber 940. For example, the Push Proxy Gateway (PPG) 952 may be used to "push" (i.e., send without a synchronous request) content to mobile subscriber 902. The PPG 952 may act as a proxy between wired and wireless networks to facilitate pushing of data to MS 940. Short Message Peer to Peer (SMPP) protocol router 953 may be provided to convert SMS-based SMPP messages to cell broadcast messages. SMPP may include a protocol for exchanging SMS messages between SMS peer entities such as short message service centers. It may allow third parties, e.g., content suppliers such as news organizations, to submit bulk messages.

To gain access to GSM services, such as speech, data, and short message service (SMS), the MS 940 may first registers with the network to indicate its current location by performing a location update and IMSI attach procedure. MS 940 may send a location update including its current location information to the MSC/VLR, via the BTS 941 and the BSC 942. The location information may then be sent to the MS's HLR. The HLR may be updated with the location information received from the MSCNLR. The location update may also be performed when the MS moves to a new location area. Typically, the location update may be periodically performed to update the database as location updating events occur.

GPRS network 957 may be logically implemented on the GSM core network architecture by introducing two packet-switching network nodes, a serving GPRS support node (SGSN) 955 and a cell broadcast and a Gateway GPRS support node (GGSN) 956. The SGSN 955 may be at the same hierarchical level as the MSC 944 in the GSM network. The SGSN may control the connection between the GPRS network and the MS 940. The SGSN may also keep track of individual MS locations, security functions, and access controls.

The Cell Broadcast Center (CBC) 971 may communicate cell broadcast messages that are typically delivered to multiple users in a specified area. A Cell Broadcast may include a one-to-many geographically focused service. It may enable messages to be communicated to multiple mobile phone customers who are located within a given part of its network coverage area at the time the message is broadcast.

The GGSN 956 may provide a gateway between the GPRS network and a public packet network (PDN) or other IP networks 958. That is, the GGSN may provide interworking functionality with external networks, and may set up a logical link to the MS through the SGSN. When packet-switched data leaves the GPRS network, it is transferred to external TCP-IP network 958, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time. The class B MS may attach to the network for both GPRS services and GSM services simultaneously. However, the class B MS may not support simultaneous operation of the GPRS services and GSM services. That is, the class B MS may use one of the two services at a given time. A class C MS may attach to one of the GPRS services and GSM services at a time.

The GPRS network 957 may be designed to operate in three network operation modes (NOM1, NOM2 and NOM3). A network operation mode of a GPRS network may be indicated by a parameter in system information messages transmitted within a cell. The system information messages may dictate to a MS where to listen for paging messages and how signal towards the network. The network operation mode may represent the capabilities of the GPRS network. In a NOM1 network, a MS may receive pages from a circuit switched domain (voice call) when engaged in a data call. The MS may suspend the data call or take both simultaneously, depending on the ability of the MS. In a NOM2 network, a MS may not receive pages from a circuit switched domain when engaged in a data call, since the MS is receiving data and is not listening to a paging channel In a NOM3 network, a MS may monitor pages for a circuit switched network while received data and vice versa.

IP multimedia network 959 was introduced with 3GPP Release 5, and includes IP multimedia subsystem (IMS) 960 to provide rich multimedia services to end users. A representative set of the network entities within IMS 960 are a call/session control function (CSCF), media gateway control function (MGCF) 962, media gateway (MGW) 965, and a master subscriber database, referred to as a home subscriber server (HSS) 968. HSS 968 may be common to GSM network 954, GPRS network 957 as well as IP multimedia network 959.

IP multimedia system 960 is built around the call/session control function, of which there are three types: interrogating CSCF (I-CSCF) 964, proxy CSCF (P-CSCF) 961 and serving CSCF (S-CSCF) 963. P-CSCF 961 may be the MS's first point of contact with IMS 960. P-CSCF 961 forwards session initiation protocol (SIP) messages received from the MS to an SIP server in a home network (and vice versa) of the MS. P-CSCF 961 may also modify an outgoing request according to a set of rules defined by the network operator (for example, address analysis and potential modification).

The I-CSCF 964 may be an entrance to a home network, may hide the inner topology of the home network from other networks, and may provide flexibility for selecting an S-CSCF. The I-CSCF 964 may contact subscriber location function (SLF) 969 to determine which HSS 968 to use for the particular subscriber, if multiple HSSs 968 are present. The S-CSCF 963 may perform the session control services for the MS 940. This includes routing originating sessions to external networks and routing terminating sessions to visited networks. S-CSCF 963 may also decide whether application server (AS) 967 is required to receive information on an incoming SIP session request to ensure appropriate service handling. This decision may be based on information received from HSS 968 (or other sources, such as application server 967). The AS 967 also communicates to location server 970 (e.g., a Gateway Mobile Location Center (GMLC)) that provides a position (e.g., latitude/longitude coordinates) of the MS 940.

The HSS 968 may contain a subscriber profile and may keep track of which core network node is currently handling the subscriber. It may also support subscriber authentication and authorization functions (AAA). In networks with more than one HSS 968, a subscriber location function provides information on HSS 968 that contains the profile of a given subscriber.

The MGCF 962 may provide interworking functionality between SIP session control signaling from IMS 960 and ISUP/BICC call control signaling from the external GSTN networks (not shown). It also may control the media gateway (MGW) 965 that provides user-plane interworking functionality (e.g., converting between AMR- and PCM-coded voice). The MGW 965 may communicate with other IP multimedia networks 966.

The Push to Talk over Cellular (PoC) capable mobile phones may register with the wireless network when the phones are in a predefined area (e.g., job site, etc.). When the mobile phones leave the area, they may register with the network in their new location as being outside the predefined area. This registration, however, may not indicate the actual physical location of the mobile phones outside the pre-defined area.

While the various embodiments have been described in connection with the preferred embodiments of the various figures, it is to be understood that other similar embodiments may be used or modifications and additions may be made to the described embodiment for performing the same function of the various embodiments without deviating therefrom. Therefore, the embodiments should not be limited to any single embodiment, but rather should be construed in breadth and scope in accordance with the appended claims.

While example embodiments of the present subject matter have been described in connection with various computing devices, the underlying concepts can be applied to any computing device or system capable of implementing the present subject matter. The various techniques described herein can be implemented in connection with hardware or software or, where appropriate, with a combination of both. Thus, the methods and apparatus for searching a phone number register, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing the present subject matter. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The methods and apparatus for short code dialing and searching a phone number register also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for providing information pertaining to a motor vehicle. When implemented on a general-purpose processor, the program code combines with the processor to provide a unique apparatus that operates to invoke the functionality of the present subject matter. Additionally, any storage techniques used in connection with the present subject matter can invariably be a combination of hardware and software.

While the present subject matter has been described in connection with the various embodiments of the various figures, it is to be understood that other similar embodiments can be used or modifications and additions can be made to the described embodiment for performing the same function of generating and searching a phone register without deviating therefrom. For example, one skilled in the art will recognize that a system for short code dialing as described can apply to any environment, whether wired or wireless, and can be applied to any number of devices connected via a communications network and interacting across the network. Therefore, providing search results with corresponding phone numbers should not be limited to any single embodiment, but rather should be construed in breadth and scope in accordance with the appended claims.

While the disclosed techniques been described in connection with the preferred embodiments of the various figures, it is to be understood that other similar embodiments may be used or modifications and additions may be made to the described embodiment for performing the same function of the presently disclosed techniques without deviating therefrom. For example, while exemplary network environments of the disclosed techniques are described in the context of a networked environment, such as a peer to peer networked environment, one skilled in the art will recognize that the presently disclosed techniques are not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the presently disclosed techniques may be implemented in or across a plurality of processing chips or devices, and storage may similarly be effected across a plurality of devices. Therefore, the presently disclosed techniques should not be limited to any single embodiment, but rather should be construed in breadth and scope in accordance with the appended claims.

What is claimed:

1. A tangible computer readable storage medium that is not a propagating signal, the computer readable storage medium comprising executable instructions that when executed by a processor, cause the processor to effectuate operations comprising:

identifying, by a first device, characteristics indicative of an occurrence of an emergency event;

detecting a second device associated with the emergency event, the second device capable of device-to-device communication with the first device within a device-to-device communication range;

transmitting, via device-to-device communication from the first device to the second device, first information related to the occurrence of the emergency event;

receiving, via device-to-device communication from the second device to the first device, second information related to the occurrence of the emergency event;

generating a report message comprising at least one or both of the first information or the second information;

evaluating, via device-to-device communication between the first device and the second device, first device characteristics associated with the first device and second device characteristics associated with the second device, the first and second device characteristics comprising at least one of respective device-to-device transmission capabilities, respective remaining battery power, respective subscriptions for transmitting emergency event information, or respective message capacity transmission capabilities;

selecting the first device as a designated transmitter of the report message when, based upon the evaluation of the first and second device characteristics, the first device characteristics are more favorable for transmission of the report message than the second device characteristics;

when the first device is selected as the designated transmitter, transmitting the report message from the first device; and receiving, via device-to-device communication, an acknowledgement of receipt of the report message.

2. The computer readable storage medium of claim 1, the operations further comprising, upon identifying the characteristics indicative of the occurrence of the emergency event, searching for devices capable of device-to-device communication.

3. The computer readable storage medium of claim 1, the operations further comprising requesting the second information from the second device.

4. The computer readable storage medium of claim 1, wherein the characteristics comprise at least one of a G-force measurement, a velocity measurement, a signal received from another source, a temperature measurement, an orientation status, a water sensor signal, or a user-controlled sensor signal.

5. The computer readable storage medium of claim 1, the operations further comprising detecting a relay device that is capable of device-to-device communication within the device-to-device communication range, wherein transmitting the report message comprises transmitting the report message to the relay device via device-to-device communication.

6. The computer readable storage medium of claim 5, wherein the acknowledgement of receipt of the report message indicates that the relay device was within range of a communications network and transmitted the report message over the communications network.

7. The computer readable storage medium of claim 5, wherein the acknowledgement of receipt of the report message indicates that the relay device transmitted the report message to at least one second relay device, and that the at least one second relay device was within range of a communications network and transmitted the report message over the communications network.

8. The computer readable storage medium of claim 5, wherein the relay device is configured to alert a user of the relay device of the occurrence of the emergency event.

9. The computer readable storage medium of claim 1, wherein the first device comprises at least one of a mobile telephone, an accelerometer, an odometer, a global positioning system unit, a water sensor, a temperature gauge, an orientation sensor, a proximity sensor, a gyro rate sensor, or an engine sensor.

10. The computer readable storage medium of claim 1, wherein the report message is generated by the first device and the operations further comprise:

selecting the second device as the designated transmitter when, based upon the evaluation of the first and second device characteristics, the second device characteristics are more favorable for transmission of the report message than the first device characteristics;

transferring the report message from the first device to the second device via device-to-device communication; and transmitting the report message from the second device.

* * * * *